(12) United States Patent
Alagourie

(10) Patent No.: US 11,524,739 B2
(45) Date of Patent: Dec. 13, 2022

(54) MOUNTING SYSTEM FOR A BICYCLE LUGGAGE CARRIER

(71) Applicant: Invented Here B.V., Ulft (NL)

(72) Inventor: Ghassan Alagourie, Zevenaar (NL)

(73) Assignee: Invented Here B.V., Ulft (NL)

( * ) Notice: Subject to any disclaimer, the term of this patent is extended or adjusted under 35 U.S.C. 154(b) by 26 days.

(21) Appl. No.: 16/610,253

(22) PCT Filed: Feb. 19, 2018

(86) PCT No.: PCT/NL2018/050108
§ 371 (c)(1),
(2) Date: Nov. 1, 2019

(87) PCT Pub. No.: WO2018/203743
PCT Pub. Date: Nov. 8, 2018

(65) Prior Publication Data
US 2020/0055559 A1    Feb. 20, 2020

(30) Foreign Application Priority Data

May 2, 2017 (NL) ..................................... 2018834

(51) Int. Cl.
*B62J 7/08* (2006.01)
*B62J 7/04* (2006.01)
*B62J 11/00* (2020.01)

(52) U.S. Cl.
CPC . *B62J 7/08* (2013.01); *B62J 7/04* (2013.01); *B62J 11/00* (2013.01)

(58) Field of Classification Search
CPC ...................................... B62J 7/04; B62J 7/08
(Continued)

(56) References Cited

U.S. PATENT DOCUMENTS 3,301,448 A * 1/1967 Inoue .................... B62J 9/00
224/431
4,325,531 A * 4/1982 Omholt .................. B62J 9/00
248/553
(Continued)

FOREIGN PATENT DOCUMENTS

DE         44 34 542 A1    4/1996
DE   20 2013 105 205 U1   12/2013
(Continued)

OTHER PUBLICATIONS

International Search Report of corresponding International Application No. PCT/NL2018/050108 dated Jun. 8, 2018 (four pages).
(Continued)

*Primary Examiner* — Nathan J Newhouse
*Assistant Examiner* — Lester L Vanterpool
(74) *Attorney, Agent, or Firm* — Kilpatrick Townsend & Stockton LLP

(57) ABSTRACT

Disclosed is a mounting system mountable on a bicycle luggage carrier, including a clamping system for clamping on the bicycle luggage carrier and a carrier coupling part mountable on the clamping system and configured to cooperate with a corresponding luggage coupling part of a bicycle accessory, wherein the clamping system includes at least two clamping sets, each clamping set including a first clamping hook and a second clamping hook each arranged to clamp a longitudinal rod of the bicycle luggage carrier, the clamping set further including an adjustment member extending between said first clamping hook and said second clamping hook such that a distance between said first and second clamping hook is adjustable.

23 Claims, 21 Drawing Sheets

(58) Field of Classification Search
USPC .......................................... 224/419, 420, 421
See application file for complete search history.

(56) References Cited

U.S. PATENT DOCUMENTS

| | | | | |
|---|---|---|---|---|
| 5,090,717 | A * | 2/1992 | Belka | B62J 7/04 224/422 |
| 5,730,414 | A * | 3/1998 | Wenger | B62D 25/2072 224/42.32 |
| 6,666,362 | B1 * | 12/2003 | LeTrudet | B60P 7/13 224/42.4 |
| 8,360,288 | B2 * | 1/2013 | Shih | B62J 7/00 224/450 |
| 9,296,442 | B2 * | 3/2016 | van Balveren | B62J 7/04 |
| 2006/0138185 | A1 * | 6/2006 | Lien | B62J 7/00 224/427 |
| 2007/0247858 | A1 | 10/2007 | Ford | |
| 2008/0073396 | A1 * | 3/2008 | Chiang | B62J 9/20 224/413 |
| 2013/0233992 | A1 * | 9/2013 | Darre | A47G 1/164 248/307 |

FOREIGN PATENT DOCUMENTS

| | | | | |
|---|---|---|---|---|
| DE | 20 2013 011 432 U1 | 1/2014 | | |
| DE | 20 2014 103 375 U1 | 10/2014 | | |
| DE | 202014103375 U1 * | 10/2014 | | B62J 7/04 |
| DE | 20 2015 002 490 U1 | 4/2015 | | |
| DE | 202015103672 U1 * | 8/2015 | | B62J 7/08 |
| DE | 20 2015 004 640 U1 | 11/2016 | | |
| EP | 2 962 921 A1 | 1/2016 | | |
| EP | 3 351 466 A1 | 7/2018 | | |
| JP | 2006088795 A * | 4/2006 | | |
| WO | 2016/155692 A1 | 10/2016 | | |

OTHER PUBLICATIONS

Bobike UK, "Bobike Click & Go Extra Large Mounting Bracket," YouTube.com, https://www.youtube.com/watch?v=qvkXR9fdV7M; two pages, (Oct. 23, 2013).

Bobike, "Bobike Universal Bicycle Rack Bracket/Mounting Bracket for Click & Fix Black 4," Amazon.co.uk, four pages, https://www.amazon.co.uk/Bobike-FA003536043-Universal-Bicycle-Mounting/dp/B00AXY38VG, (Jan. 4, 2013).

ThuleBringYourLife, "Child bike seat accessory Thule Yepp Maxi EasyFit Adapter," YouTube.com, https://www.youtube.com/watch7v=LFpZT8yge5k, one page, (Jan. 31, 2017).

Yepp Fietzitjes, "Mounting-Yepp-Maxi-with-Easyfit-carrier," YouTube.com, https://www.youtube.com/watch?v=aBvQdhuA43c, one page, (Oct. 27, 2014).

Thule, Inc. "Thule Yepp Maxi Easyfit Child Bike Seat Adapter," Amazon.ca, https://www.amazon.ca/Thule-12020409-Easyfit-Adapter-Black/dp/B00P97LRLK/ref=sr_1_5?crid=10RDHLWQZ8D0H&keywords=Thule+Yepp+Maxi+Easyfit+Child+Bike+Seat+Adapter&qid=1646680020&sprefix=thule+yepp+maxi+easyfit+child+bike+seat+adapter%2Caps%2C139&sr=8-5, one page, Seymour, CT (Oct. 24, 2016).

* cited by examiner

Fig. 2c
Fig. 2d
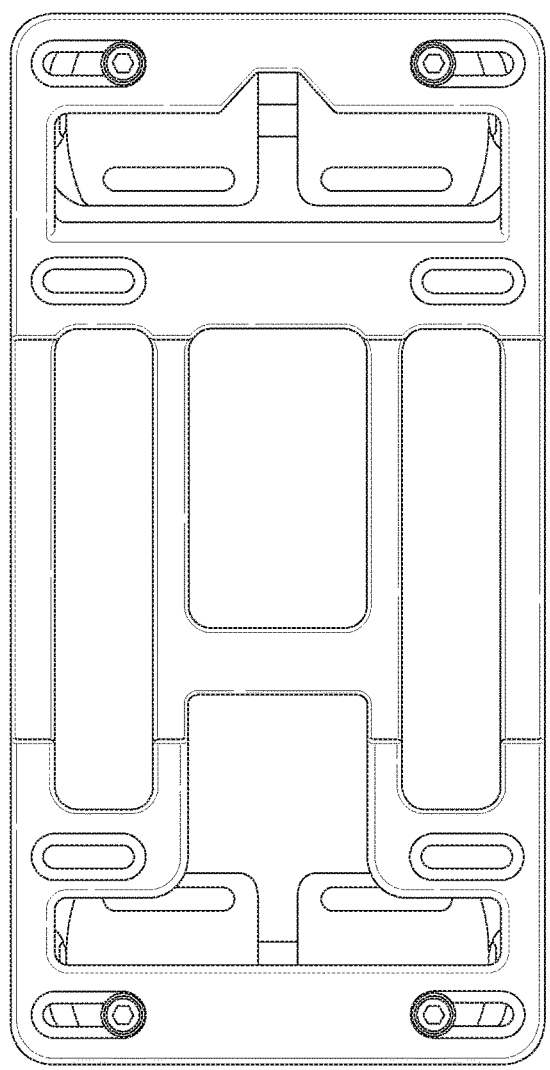
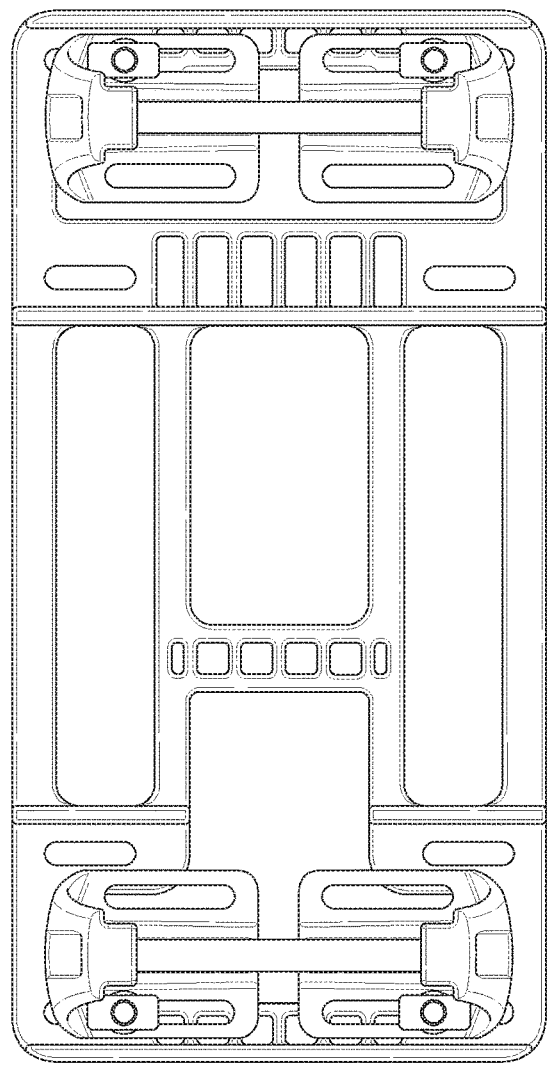

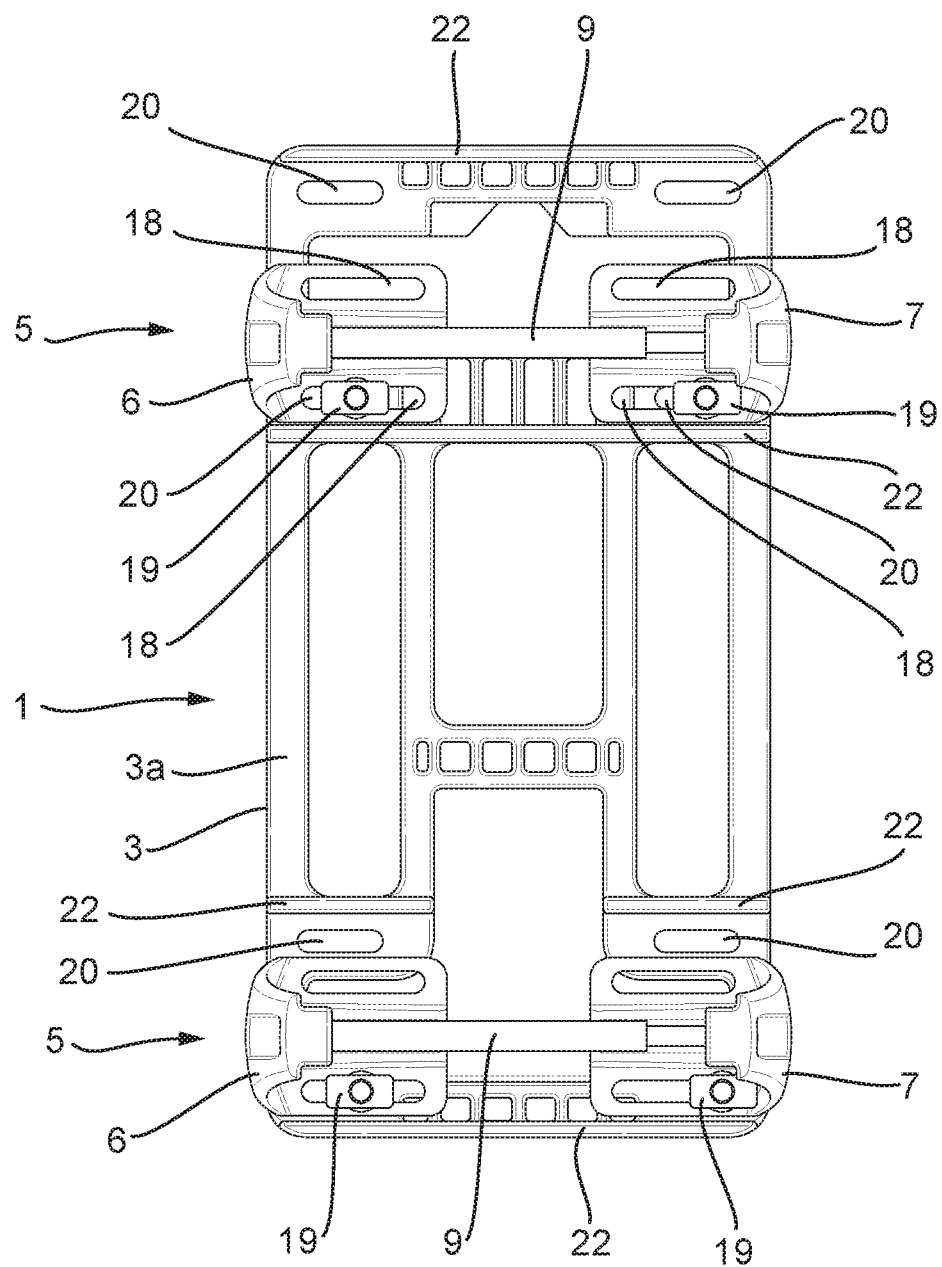

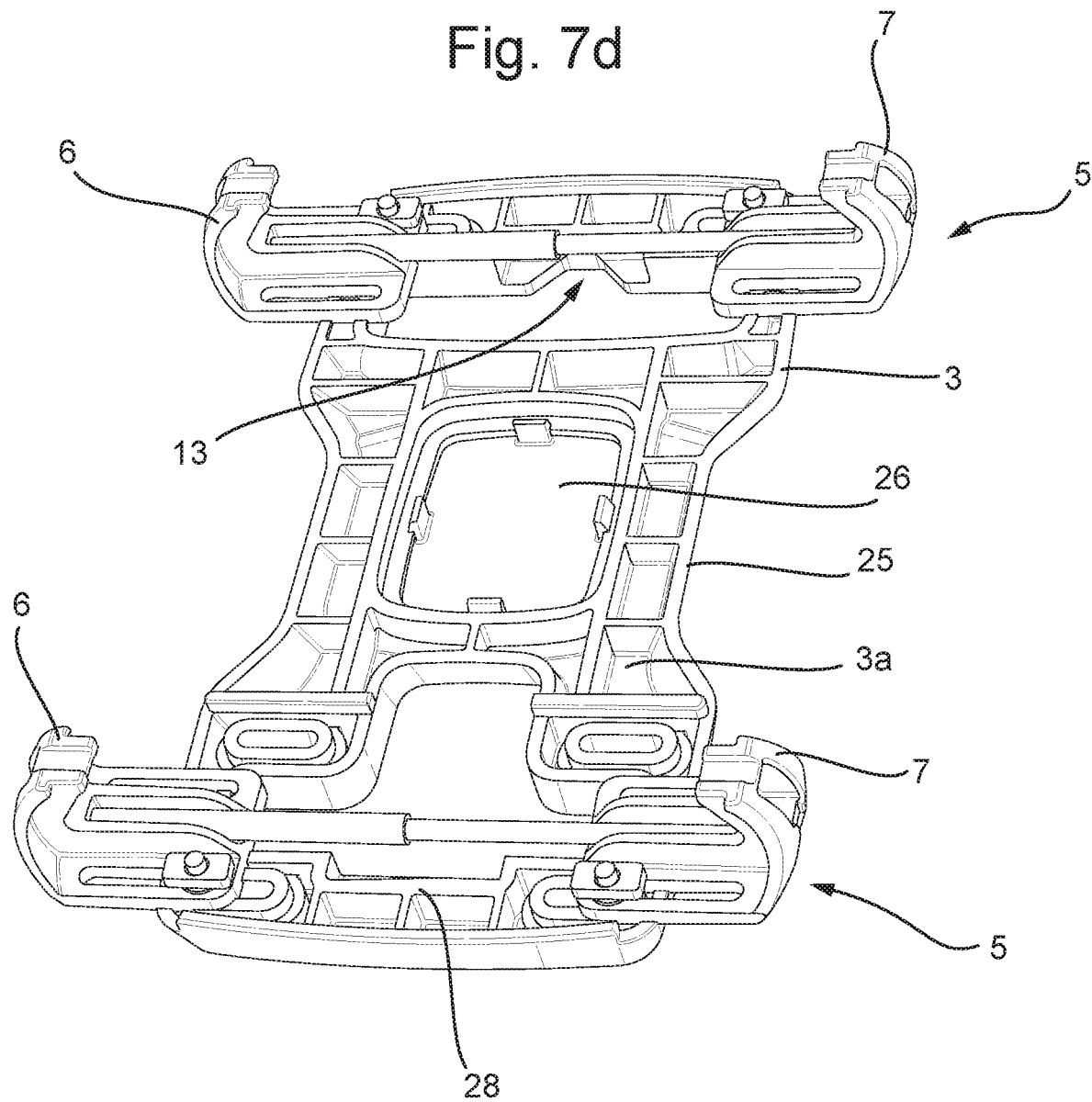

MOUNTING SYSTEM FOR A BICYCLE LUGGAGE CARRIER

This application is the National Phase of International Application No. PCT/EP2018/050108, filed Feb. 19, 2018, which claims priority to the Netherlands Patent Application No. 2018834, filed May 2, 2017, the disclosures of which are incorporated by reference herein.

The invention relates to a mounting system for a bicycle luggage carrier.

Bicycle riders often wish to transport one or more items, for example bags, on their bike. Fastening such items on the bike, for example on a bicycle luggage carrier, which is part of the bicycle frame and generally located at the rear of the bike, often proves to be relatively cumbersome, and may take quite some time. Moreover, these items are not always securely fastened, leading to a relatively high risk of falling off the bike and causing potentially dangerous situations for the rider. In recent years, ready-to-use plug-in systems have been developed to overcome the above-mentioned problems. However, these systems usually only work on a luggage carrier that has been specifically designed for the purpose. It is therefore not always possible, or it may even be impossible, to use these systems on a conventional bicycle. Hindering elements may for example comprise an unusual width of the luggage carrier, or the presence of a battery pack at the rear of the bicycle.

It is an aim of the present invention to solve or alleviate one or more of the above-mentioned problems. Particularly, the invention aims at providing a solid mounting system for a bicycle luggage carrier, which is mountable on a wide variety of bicycle luggage carriers in a relatively easy way providing a relatively easy-to-use system for relatively safely securing bicycle accessories on the mounting system.

To this aim, there is provided a mounting system characterized by the features of claim 7. In particular, the mounting system is mountable on a bicycle luggage carrier, and comprises a clamping system for clamping on the bicycle luggage carrier and a carrier coupling part mountable on the clamping system. The carrier coupling part is configured to cooperate with a corresponding luggage coupling part of a bicycle accessory. The clamping system comprises at least two clamping sets, each clamping set including a first clamping hook and a second clamping hook, which hooks are each arranged to clamp a longitudinal rod of the bicycle luggage carrier. The clamping set further includes an adjustment member extending between said first clamping hook and said second clamping hook such that a distance between said first and second clamping hook is adjustable. A shoulder of each of said first clamping hook and of said second clamping hook includes an upper coupling part contact surface and a lower rod contact surface. The shoulder of said first clamping hook and the shoulder of said second clamping hook are arranged to receive said adjustment member between said upper coupling part contact surface and said lower rod contact surface. In other words, the adjustment member extends from the shoulder of each of the first and second hook substantially in line with said shoulder. As a result, clamping forces are better spread over the clamping sets than when said adjustment member is placed substantially below or above a line linking said shoulders, thus substantially avoiding bending of the clamping sets, which is a recurrent problem in prior art clamping systems. The clamping forces can thus be optimally distributed to the longitudinal rods of the bicycle luggage carrier. The judicious placement of the adjustment member can thus provide a mounting system which is relatively solid, independently of the adjustable distance between said first and second clamping hook.

The adjustment member can advantageously comprise an externally threaded bolt and an internally threaded tube arranged to receive said externally threaded bolt. In this way, the mounting system can be fit on a continuous range of widths of luggage carriers in a relatively easy way, as the mounting system can be clamped on the luggage carrier by screwing the bolt in the tube. The threads of the bolt and the tube can ensure the clamping set to remain blocked in the desired position. At the same time, the use of an internally threaded tube rather than a nut can provide additional stability and/or stiffness to the mounting device by supporting the bolt thus avoiding bending, and can also protect the bolt, especially the bolt's external thread, against dirt and/or damage. Alternatively, other adjustment members can be used, such as for example telescopically sliding members.

A length of the internally threaded tube is preferably substantially the same as a length of a shank of the externally threaded bolt. Such a configuration can ensure an optimal use of the length of the adjustment member over substantially its entire range while avoiding that a part of the adjustment member protrudes from the clamping hook outwardly, which may damage accessories or even harm a user.

It is preferred that one of the first and second clamping hook is arranged to block the internally threaded tube against rotation. Said clamping hook can for example comprise a non-circular recess arranged to receive a head of said adjustment member. The shape of said recess can preferably correspond to the shape of the adjustment member's head, for example a substantially polygonally shaped head and/or recess, such as for instance a hexagonal head and/or recess, or any other suitable shape. The blocking of the rotation of the internally threaded tube can improve the user-friendliness of the mounting system, as the adjustment member can be adjusted with a single screwing movement. Alternatively, it is also possible to arrange one the first and second clamping hook to block rotation of the externally threaded bolt, while the other of the first and second clamping hook is configured to allow rotation of the internally threaded tube.

A length of the adjustment member can for example allow adjustment of the distance between said first and second clamping hook to vary in a range of approximately 70-160 mm, more preferably in a range of approximately 80-150 mm, which range covers a substantial variety of luggage carrier widths, thus providing a relatively versatile mounting system. Said range is measured between an external side of the most external longitudinal rods of the luggage carrier on which the mounting system can be mounted. The longitudinal rods of a luggage carrier are understood to be the rods extending in the longitudinal direction of the bicycle between the front and the rear wheel.

In a preferred embodiment, the first and second clamping hooks can each comprise an arm having an acute angle with the shoulder forming a receiving space to receive a longitudinal rod of the bicycle luggage carrier. The acute angle between said arm and said shoulder of the clamping hooks can provide a receiving space for a continuous range of diameters of luggage carrier longitudinal rods, for example diameters varying in a range of approximately 5 mm to approximately 20 mm.

More preferably, the angle between the shoulder and the arm of the first and second clamping hooks may be comprised in a range of 45-60 degrees, preferably in a range of 50-60 degrees, more preferably around approximately 55 degrees. Such an angle can receive a variety of longitudinal rod diameters, while the arm can remain sufficiently short such that the arm does not interfere with an possible battery pack on a the bicycle luggage carrier.

Advantageously, the receiving spaces of the first and second clamping hooks of a clamping set can be facing each other. In this way, the hooks of the clamping sets can engage an outer side of the bicycle longitudinal rods when mounted, and exert a clamping force on the longitudinal rods which is directed inwardly. Such way of clamping seems to be more universally applicable on a bicycle luggage carrier than a clamping system pushing the longitudinal rods outwardly, as for example a battery pack might be located between said longitudinal rods.

The first and second clamping hooks can preferably be manufactured from a plastic material, such as for example from PA, PP, PVC, or from a combination of different plastic materials, for example including nylon. More preferably, the first and second clamping hooks can be manufactured by means of injection-moulding. In a most preferred embodiment, the clamping hooks are manufactured from injection-moulded plastic, providing a relatively solid structure which is relatively easy to manufacture.

It is preferred that the shoulder of each of said first clamping hook and of said second clamping hook includes at least one through-slit substantially in parallel with the adjustment member and arranged to receive fastening elements for fastening the carrier coupling part to the clamping system. By providing a through slit instead of providing holes, the width of the mounting system can be adjusted in a more continuous way. The slit may, but need not, be located centrally on the shoulder, for a good distribution of forces on the shoulder.

More preferably, the shoulder includes at least two through-slits substantially in parallel, preferably on either side of the shoulder seen in a direction of the adjustment member. Fastening elements for fastening the carrier coupling part to the clamping system can thus be located next to the adjustment member rather than on top of it, which can simplify the design of the clamping hook and allow a reduced thickness of the shoulder.

In an advantageous way, the carrier coupling part can include at least two pairs of through-slits, wherein each pair of slits is arranged to receive fastening elements for fastening the carrier coupling part to one of the at least two clamping sets. Analogously to the shoulders, through slits for receiving fastening elements can provide a continuous range of width adjustment to the mounting system. Moreover, when through-slits are present both in the shoulders and in the carrier coupling part, the length of these slits combine into extra width for the mounting system. Each through-slit of a pair of slits is situated on either side of the carrier coupling part in a longitudinal direction of the mounting system, such that each through-slit of a pair of slits is arranged to receive fastening elements to fasten one of the first or the second clamping hook of a clamping set to the carrier coupling part. In case of two pairs of through-slits, each pair is preferably located on either side of a front side and a rear side of the mounting system seen in the longitudinal direction, such that the at least two clamping sets which are mountable to the carrier coupling part via said two pairs of through-slits are spaced-apart in a longitudinal direction of the mounting system. Providing more pairs of through-slits in the carrier coupling part, for example three, four or more pairs, may further raise the number of fastening points. These pairs may for example be equally spread over a longitudinal direction of the carrier coupling part, or may be grouped at a front or a rear side of the mounting system seen in the longitudinal direction.

A lower clamping set engaging side of the carrier coupling part may for example include at least one transverse ridge arranged to define a position of one of the at least two clamping sets with respect to the carrier coupling part. Such a transverse ridge may limit the number of mounting possibilities of the clamping set to the carrier coupling part. At the same time, such a transverse ridge can provide guidance for the clamping hooks in a transverse direction when adjusting the clamping sets to a desired width while mounting the mounting system on a bicycle luggage carrier.

Advantageously, an upper side of the carrier coupling part can include a recess over an entire width of the carrier coupling part. The recess may allow use of for example carrier straps without hindering coupling of a bicycle accessory to the carrier coupling part. The one or more recesses may have the shape of a transverse slot, or may be larger in the longitudinal direction of the carrier coupling part. The upper side of the carrier coupling part is the side arranged to face a corresponding luggage coupling part of a bicycle accessory.

It is preferred that the carrier coupling part includes a substantially V-shaped connecting opening arranged to receive a corresponding guiding element of a coupling element of a corresponding luggage coupling part of a bicycle accessory. The substantially V-shaped connecting opening can for example include a truncate V-shape, which can also be described as a substantially trapezial shape, preferably an isosceles trapezial shape. The carrier coupling part preferably includes a transverse rib configured to be engaged by a coupling element of a corresponding luggage coupling part of a bicycle accessory. Preferably, both a top and a bottom side of said transverse rib can be engaged by said coupling element, such that the rib is clamped or partially enclosed by said coupling element. The connecting opening is preferably located centrally on said transverse rib of the carrier coupling part, the transvers rib for example being located on one of a front and rear side of the carrier coupling part in the longitudinal direction. The connecting opening can be directed towards the other of the front and rear side of the carrier coupling part, i.e. to an inner side of the carrier coupling part instead of being directed away from the carrier coupling part. The specific shape of the connecting opening can facilitate the positioning of an accessory on the mounting system by guiding insertion of the accessory.

A corresponding luggage coupling part can for example comprise a first coupling element located at a first transversal side of the luggage coupling part and a second coupling element located at a second transverse side opposite the first transverse side. The first transverse side can for example be the front side and the second transverse side the rear side of the luggage coupling part, or vice versa. The first coupling element can include a transverse rib extending between longitudinal sides of a for example substantially rectangularly shaped luggage coupling part, arranged to engage an upper side, i.e. arranged to face the luggage coupling part, of a corresponding carrier coupling part. The first coupling element can further include a transverse plate element substantially in parallel with the transverse rib, and connected to but spaced-apart from said transverse rib, which transverse plate element is arranged to engage a bottom side, i.e. arranged to face away from the corresponding luggage coupling part, of a corresponding carrier coupling part. A space in between said transverse rib and said transverse plate element can form a receiving space arranged to receive a connecting element of a corresponding carrier coupling part, providing an easy coupling of the luggage coupling part with the corresponding carrier coupling part. The plate element can, but need not, extend between longitudinal sides of the luggage coupling part. The first coupling element can further include a guiding element extending between said transverse rib and said transverse plate element, wherein said guiding element is preferably V-shaped. The guiding element can prevent lateral or transverse movement of the luggage coupling part on the carrier coupling part. The guiding element is preferably located centrally on the transverse rib. The V-shape of the guiding element can improve guiding of the luggage coupling part towards a desired position. Other shapes, such as a truncate V-shape or a U-shape are possible as well. The second coupling element can for example comprise a locking element arranged to lock the luggage coupling part on the carrier coupling part. Said locking element can include one or more pre-tensioned hook elements or joggles, for example located centrally in a transverse direction. The luggage coupling part can for example be a substantially rectangular plate-like part. It is preferred that a bottom side configured to face the carrier coupling part is a substantially flat side. When an element does protrude from this side, it may easily get damaged when the bicycle accessory is put down onto the ground, which is especially prejudicial if the protruding element is a coupling element. Alternatively, instead of being a plate-like part, the luggage coupling part can just include the first and second coupling elements which are connected to each other by for example one or more linking rods. The luggage coupling part can also be of any other shape, such as a substantially tapered or conical shape, which is also the case of the carrier coupling part.

The carrier coupling part can include a locking member for receiving a locking element of a corresponding luggage coupling part of a bicycle accessory. Said locking member can for example include a ridge behind which a pre-tensioned hook element or joggle can be locked. The locking member can preferably be made difficult to access, such that the locking element of the corresponding luggage coupling part cannot be easily unlocked without help of an additional release element, which can for example be insertable in one of the carrier coupling part and the luggage coupling part. Other variants of locking mechanisms are possible. The locking member is preferably located at a distance from the V-shaped connecting opening, as seen in the longitudinal direction. This exemplary fastening system for fastening a bicycle accessory on a bicycle luggage carrier comprising a luggage coupling part and a corresponding carrier coupling part as described above can be considered as a separate invention. Alternatively, the carrier coupling part can be comprised in the bicycle luggage carrier without the need for a coupling system.

Alternatively, the carrier coupling part can comprise various elements, such as holes, openings, ridges, hooks, etc. allowing quick, easy and safe fastening of a bicycle accessory on the mounting system, as long as these elements are configured to cooperate with corresponding elements on a luggage carrier part of the bicycle accessory. As an example, the carrier coupling part can for example be configured to cooperate with a bicycle accessory equipped with the Racktime® system.

A further aspect of the invention can provide a mounting system for a bicycle luggage carrier according to the features of claim 22, which can lead to a relatively cheap mounting system providing one or more of the above-mentioned advantages.

A third aspect of the invention can provide a mounting system for a bicycle luggage carrier according to the features of claim 1. An advantage of this embodiment is that even if the bicycle luggage carrier deforms, this does not affect the connection between the clamping system and the bicycle luggage carrier because each clamp is individually connected to a rod of the bicycle luggage carrier. Also, at least some of the above-mentioned advantages of the first aspect of the invention are provided. Various features of the first aspect can be combined with the third aspect as well, as is apparent from the subclaims.

The present invention will be further elucidated with reference to figures of exemplary embodiments. Corresponding elements are designated with corresponding reference signs.

FIGS. 2a-2d show a front, side, top and bottom view respectively of the mounting system of FIGS. 1a-1e in a first position adapted for a small size of luggage carrier;

FIGS. 5a-5d show a bottom view of the mounting system of FIGS. 1a-1e in various mounting positions;

FIGS. 7a-7d show a perspective top (a-c) and bottom (d) view of a second exemplary embodiment of the mounting system according to the invention;

Figure 1A:
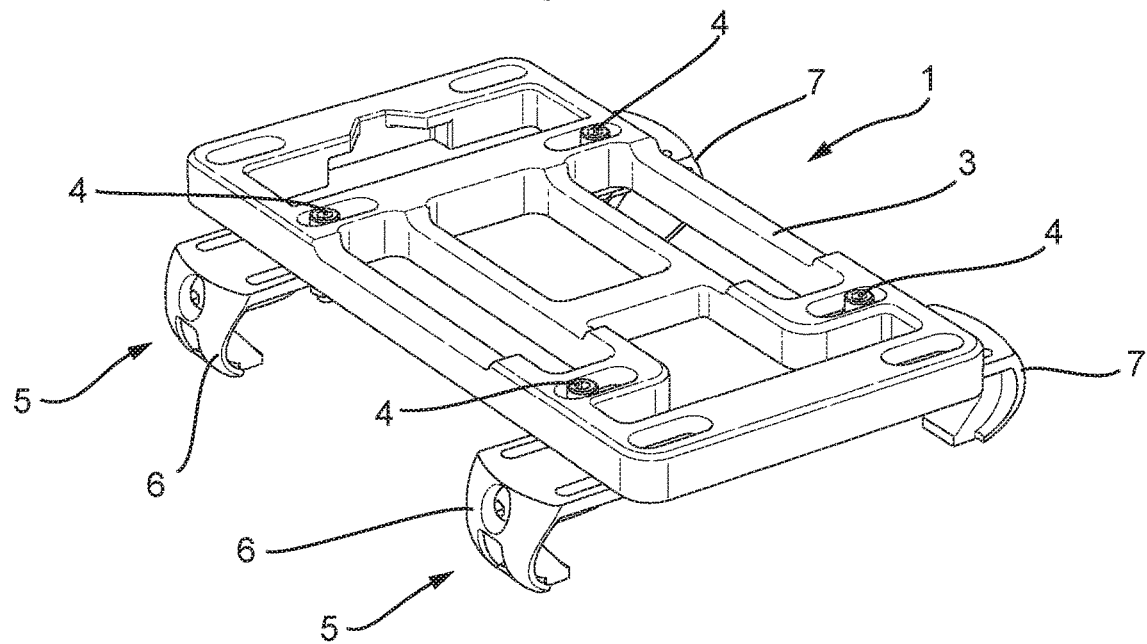
FIGS. 1a-1f show steps of mounting a first exemplary embodiment of a mounting system according to the invention on a bicycle luggage carrier.
Figure 1B:
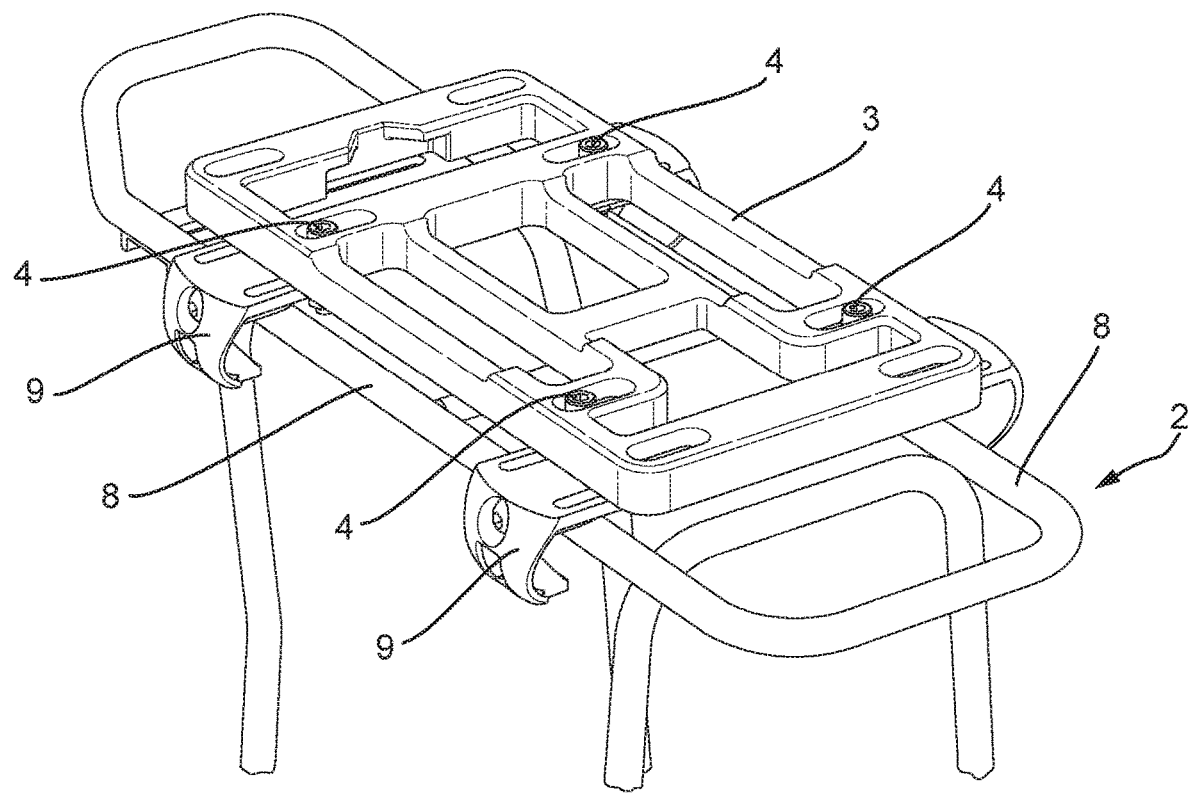
Figure 1C:
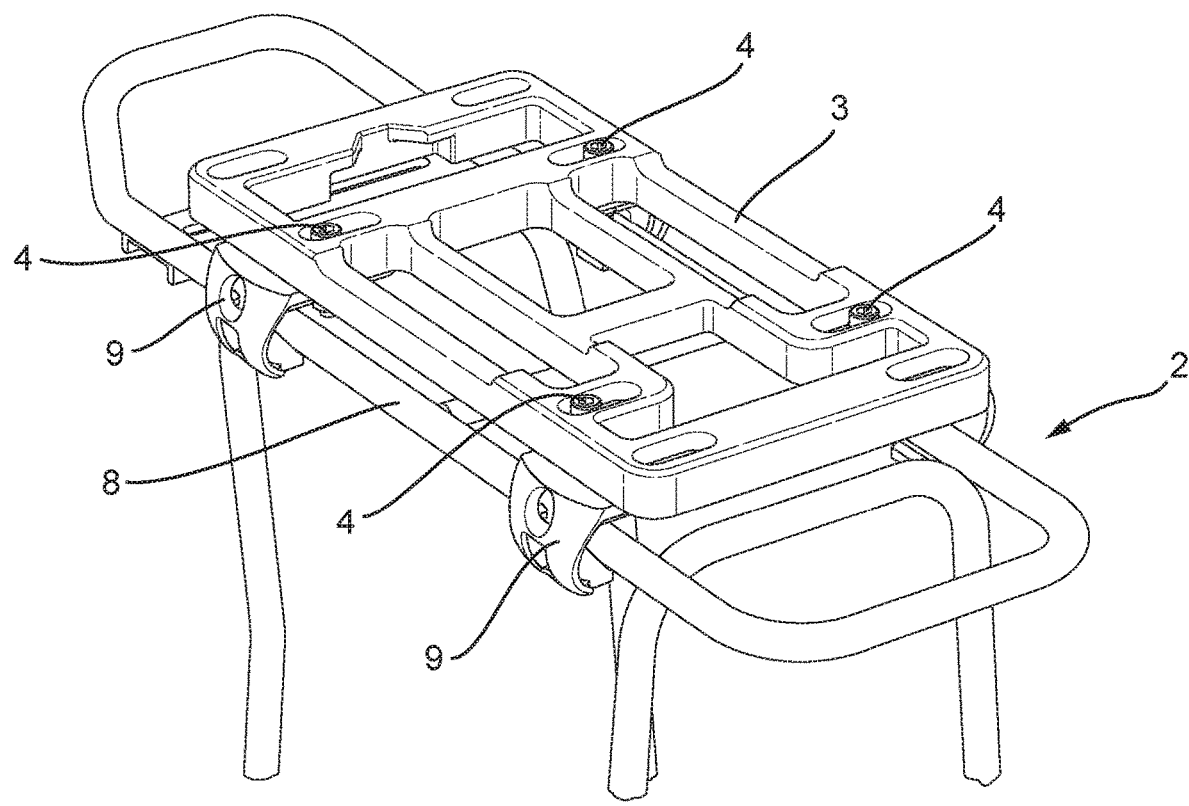
Figure 1D:
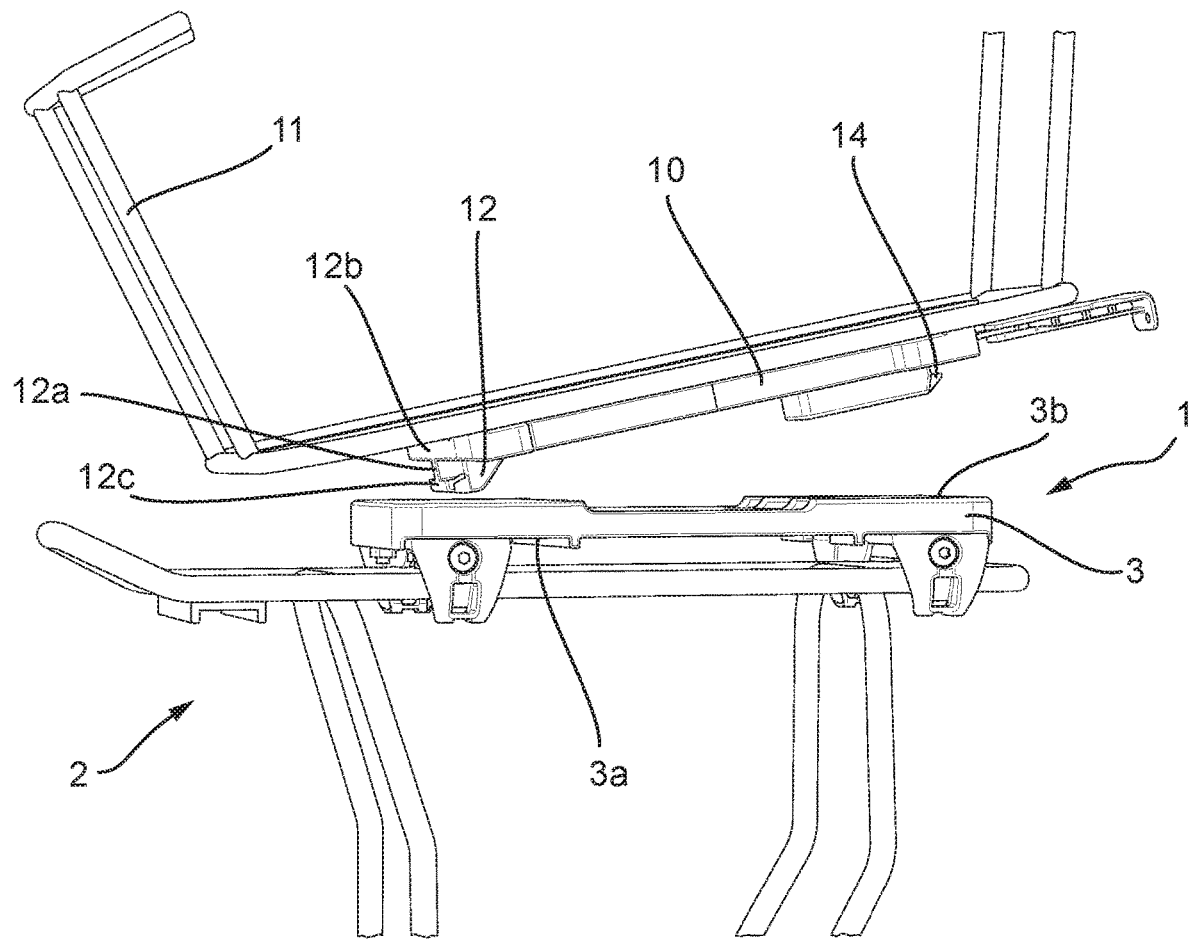
Figure 1E:
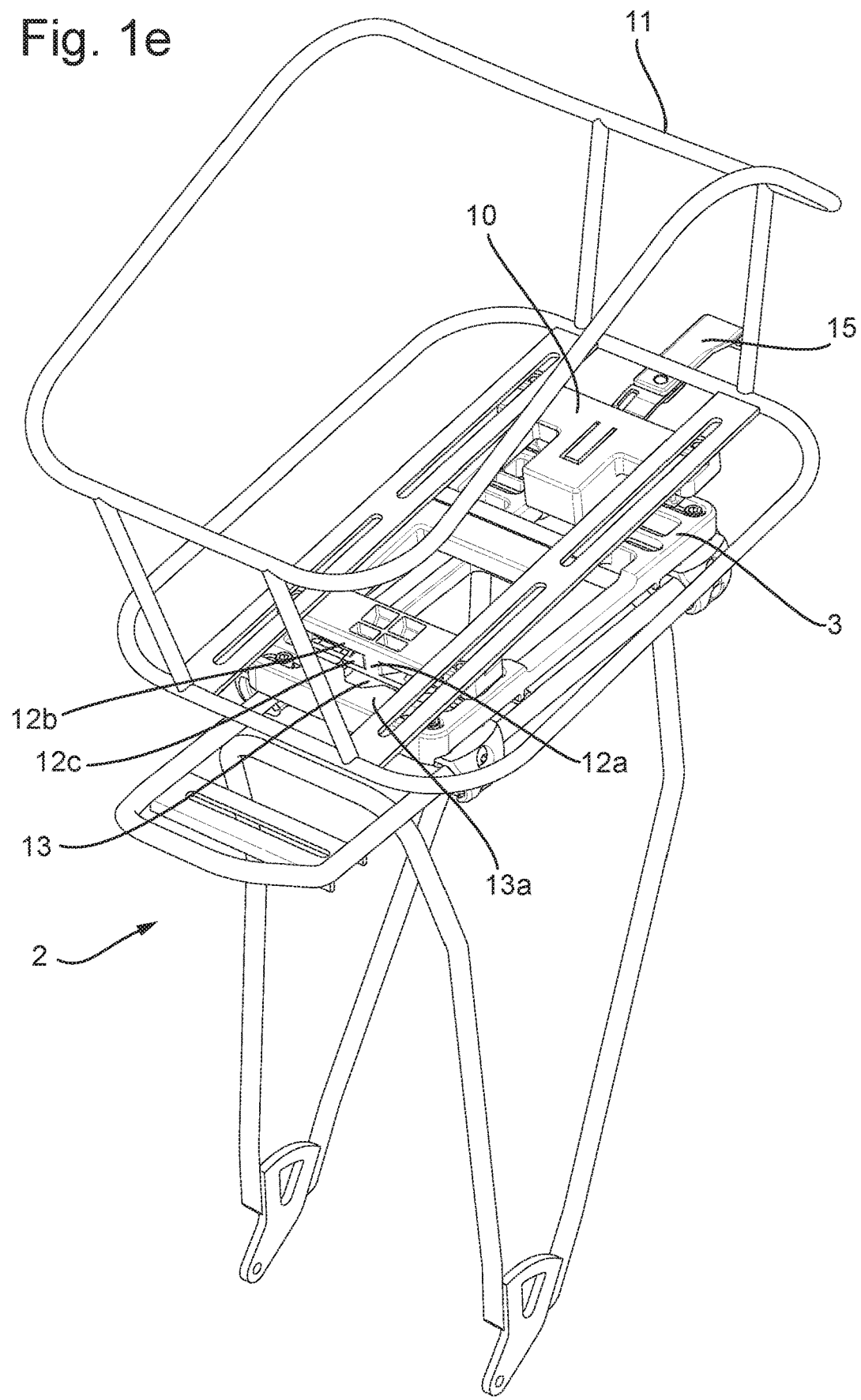
Figure 1F:
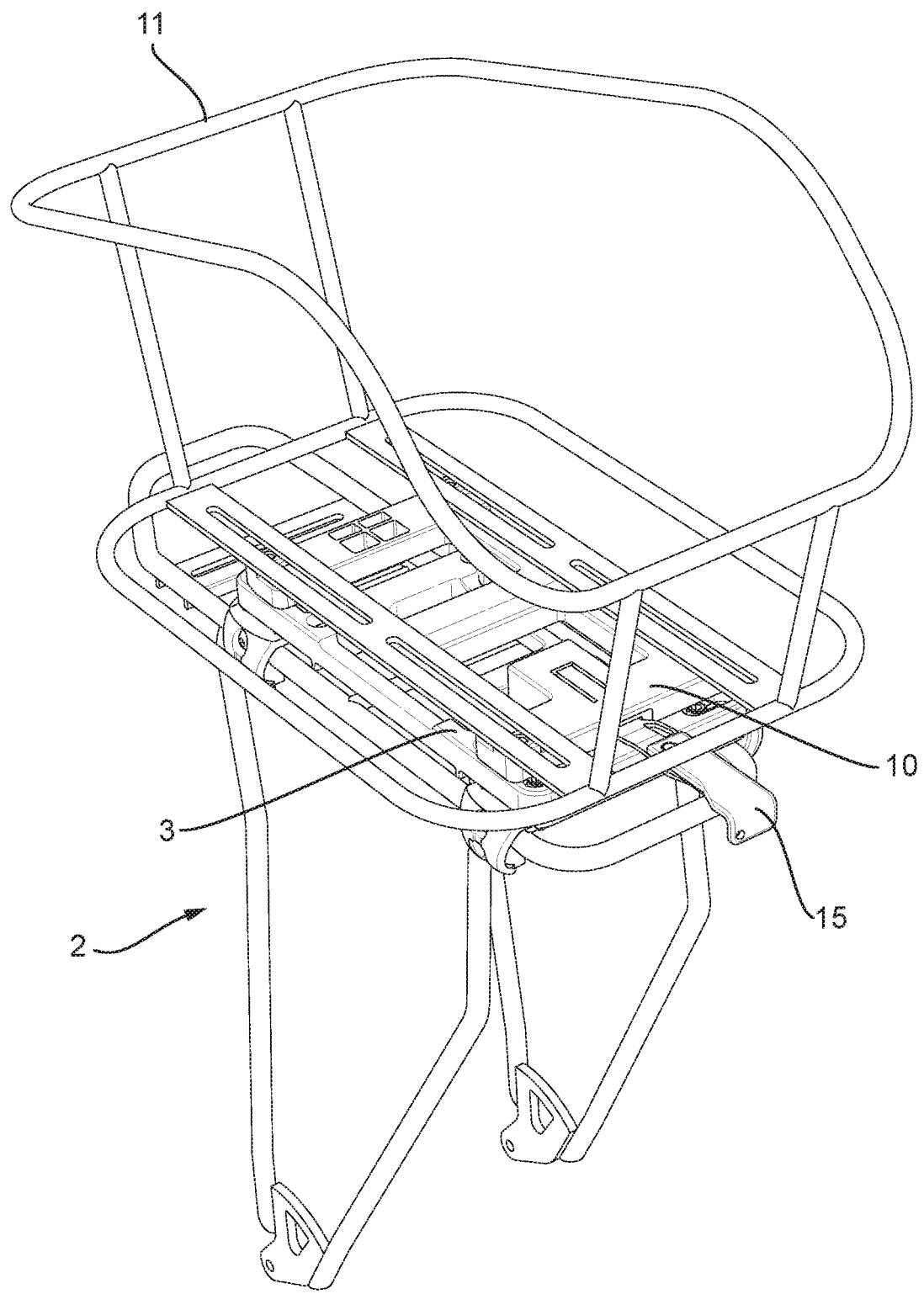

FIGS. 1a-1f show steps of mounting a first exemplary embodiment of a mounting system according to the invention on a bicycle luggage carrier. FIG. 1a shows a perspective view on a mounting system 1 according to the invention. The mounting system 1 comprises a clamping system for clamping on the bicycle luggage carrier 2, and a carrier coupling part 3 mountable on the clamping system, for example using fastening elements 4, such as for instance screws or bolts or any other suitable fastening element. The clamping system comprises at least two clamping sets 5, each clamping set including a first clamping hook 6 and a second clamping hook 7 each arranged to clamp a longitudinal rod 8 of the bicycle luggage carrier 2. The clamping set 5 further includes an adjustment member 9 extending between said first clamping hook 6 and said second clamping hook 7 such that a distance between said first and second clamping hook 6, 7 is adjustable. When mounting the mounting system 1 on a bicycle luggage carrier 2, the distance between said first and second clamping hook 6, 7 can be adjusted, as shown in FIG. 1b, for example by screwing the adjustment member 9 until the first and second clamping hooks 6, 7 each clamp a respective longitudinal rod 8 of the bicycle luggage carrier 2. Once the clamping system has been adjusted to the width of the bicycle luggage carrier 2, the carrier coupling part 3, which is configured to cooperate with a corresponding luggage coupling part 10 of a bicycle accessory 11, can be fastened to the at least two clamping sets 5, as shown in FIG. 1*c*. This can for example be done by tightening loosely pre-installed fastening elements 4. In this configuration, the mounting system 1 is installed on the bicycle luggage carrier 2 and is ready for use with a bicycle accessory 11, such as a bag, which is equipped with a corresponding luggage coupling part 10. As an example, illustrated in FIGS. 1*d* and 1*e*, such a corresponding luggage coupling part 10 of a bicycle accessory 11 can include a nose-like guiding element 12*a* of a first coupling element 12 at a first transverse side, which can be inserted into a substantially V-shaped connecting opening 13 included in the carrier coupling part 3 arranged to receive the guiding element of the corresponding coupling element 12. The shape of the corresponding elements 12, 13 can guide the placing of the accessory 11 on the mounting system 1, thus simplifying the action for the user. The first coupling element 12 can also include a transverse rib 12*b* extending between longitudinal sides of the substantially rectangularly shaped luggage coupling part 10. The transverse rib 12*b* is arranged to engage an upper side 3*b*, i.e. arranged to face the luggage coupling part 10, of a corresponding carrier coupling part 3. The first coupling element 12 can further include a transverse plate element 12*c* substantially in parallel with the transverse rib 12*b*, and connected to but spaced-apart from said transverse rib 12*b*. The transverse plate element 12*c* is arranged to engage a bottom side 3*a*, i.e. arranged to face away from the corresponding luggage coupling part 10, of a corresponding carrier coupling part 3. A space in between said transverse rib 12*b* and said transverse plate element 12*c* can form a receiving space arranged to receive a connecting element 13*a* of a corresponding carrier coupling part 3, which connecting element 13*a* is a transverse rib of the carrier coupling part 3, or part of said rib, in the present case. At a second transverse side opposite the first, as illustrated in FIG. 1*d*, the luggage coupling part 10 can for example include a second coupling element, such as a pre-tensioned hook element 14. The carrier coupling part 3 may for example comprise a locking member for receiving and locking the second coupling element of a corresponding luggage coupling part 10 of a bicycle accessory 11. Said locking member can for example be a ridge configured to receive and lock said second coupling element 14 of the luggage coupling part 10, for instance a pre-tensioned hook element 14. In this way, the bicycle accessory 11 can be easily fastened on the mounting system 1, in only two movements: a first oblique insertion of the corresponding connecting elements 12, 13 on a first transverse side, and a second movement pushing down the opposite transverse side which may lock the accessory 11 by clicking into place. The system can further be configured such that the luggage coupling part 10 can only be released from the carrier coupling part 3 by the insertion of a release element 15 into one of the carrier coupling part 3 (not shown) and the luggage coupling part 10, as illustrated in FIG. 1*f*. By taking the release element 15 out of the system, an additional security against theft of the bicycle accessory 11 can be provided, as unlocking the pre-tensioned hook element 14 from the locking member can be made extremely difficult or even hardly possible without the release element 15.

Figure 2A:
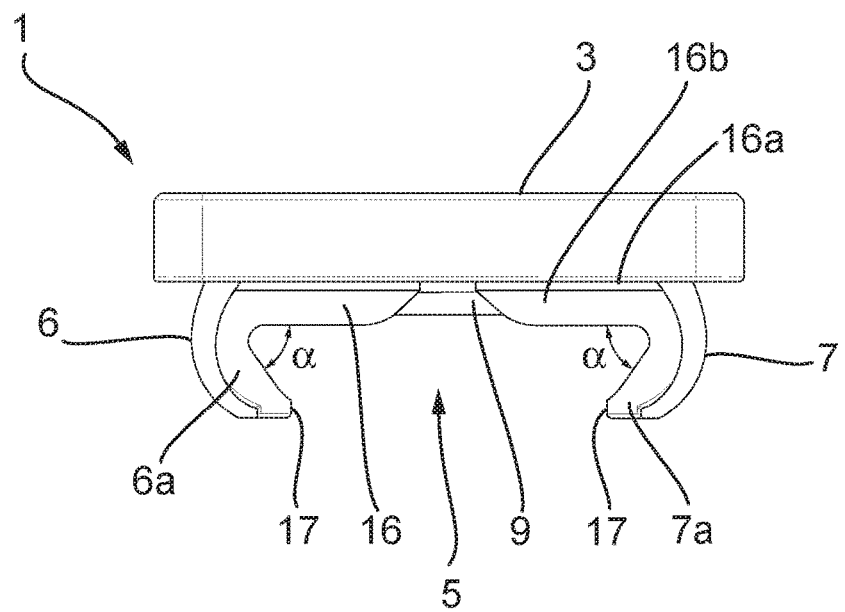
Figure 2B:
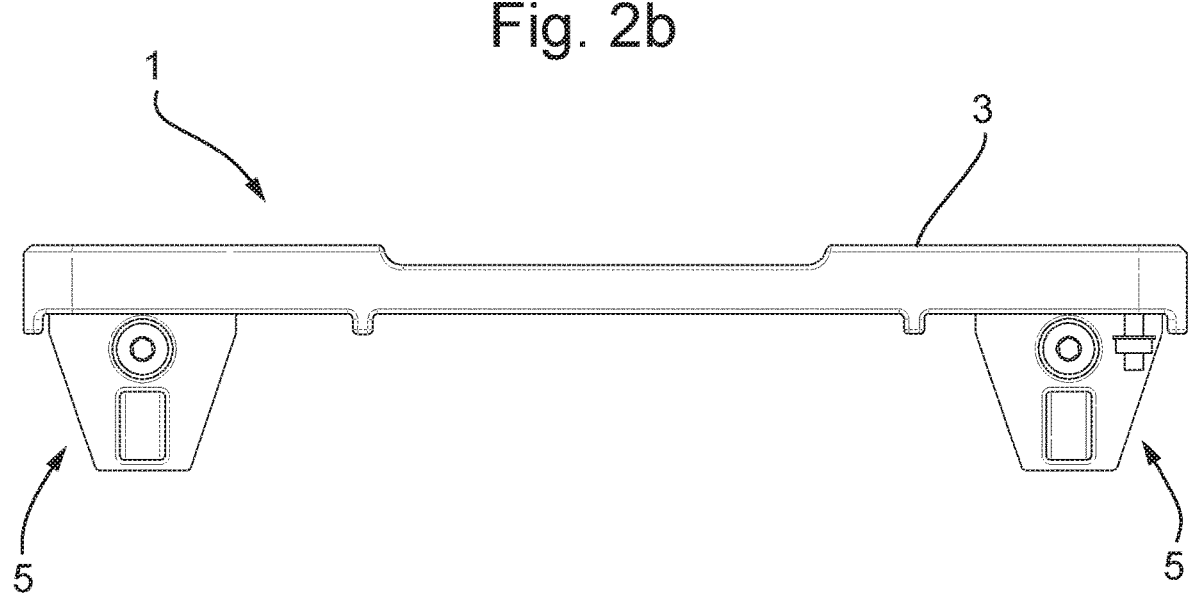
Figure 3:
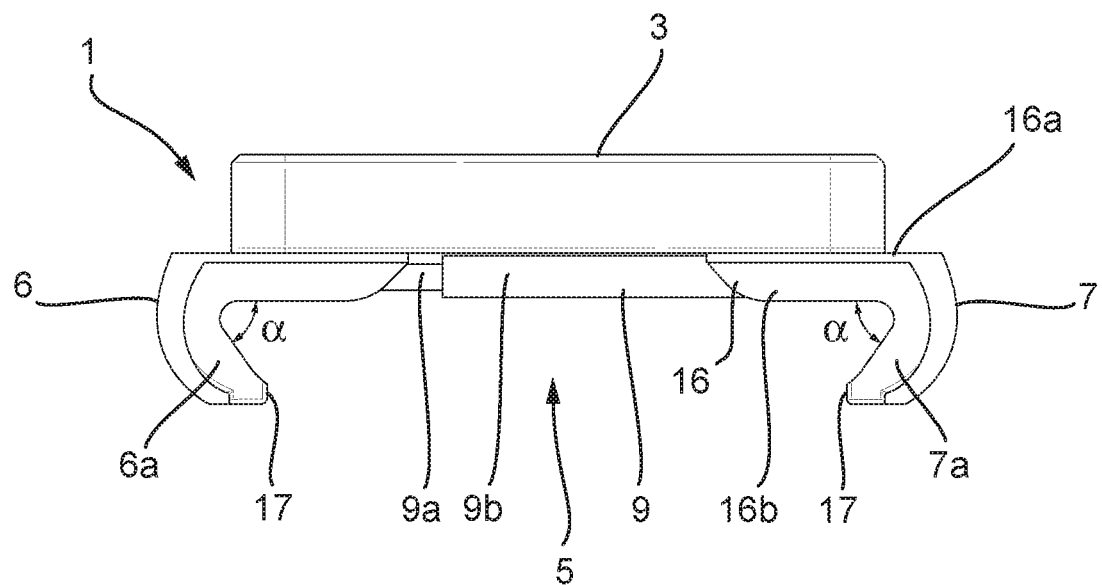
FIG. 3 shows a front view of the mounting system of FIGS. 1a-1e in a second position adapted for a medium-sized luggage carrier.
Figure 4A:
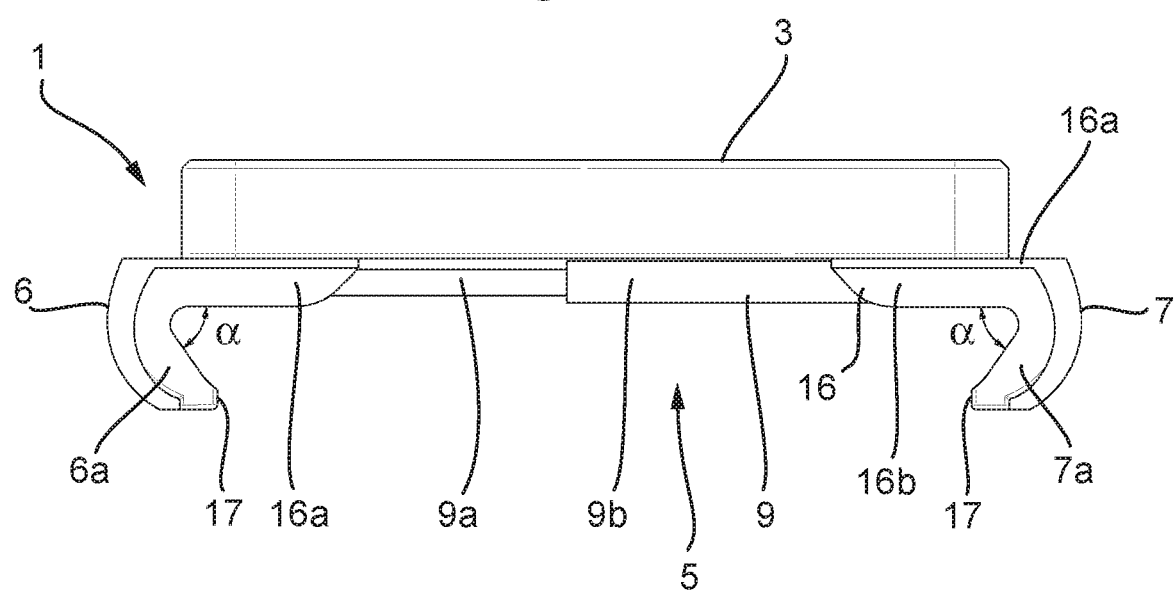
FIG. 4a-4d show a front, side, top and bottom view respectively of the mounting system of FIGS. 1a-1e in a third position adapted for a large luggage carrier.
Figure 4B:
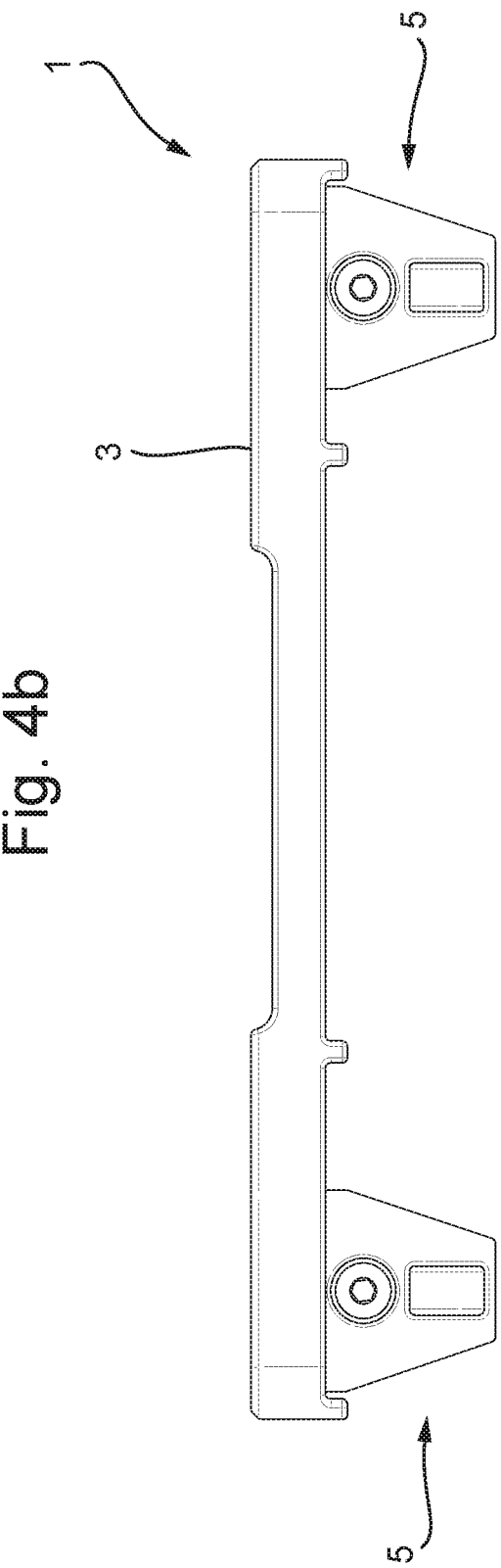
Figure 4C:
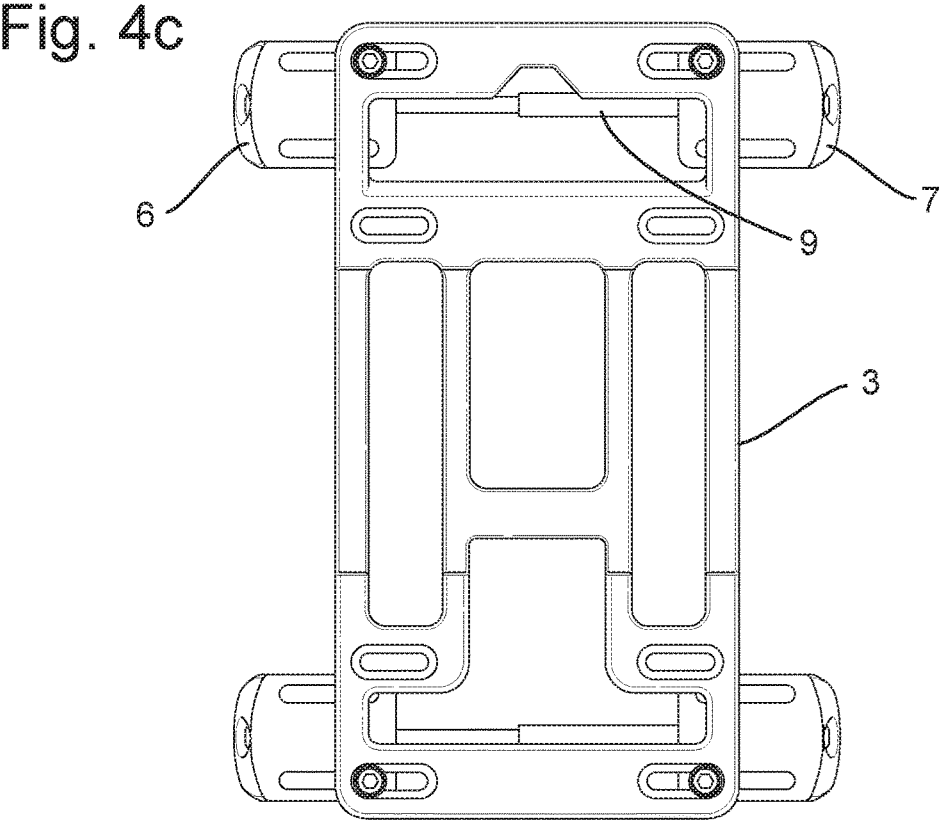
Figure 4D:
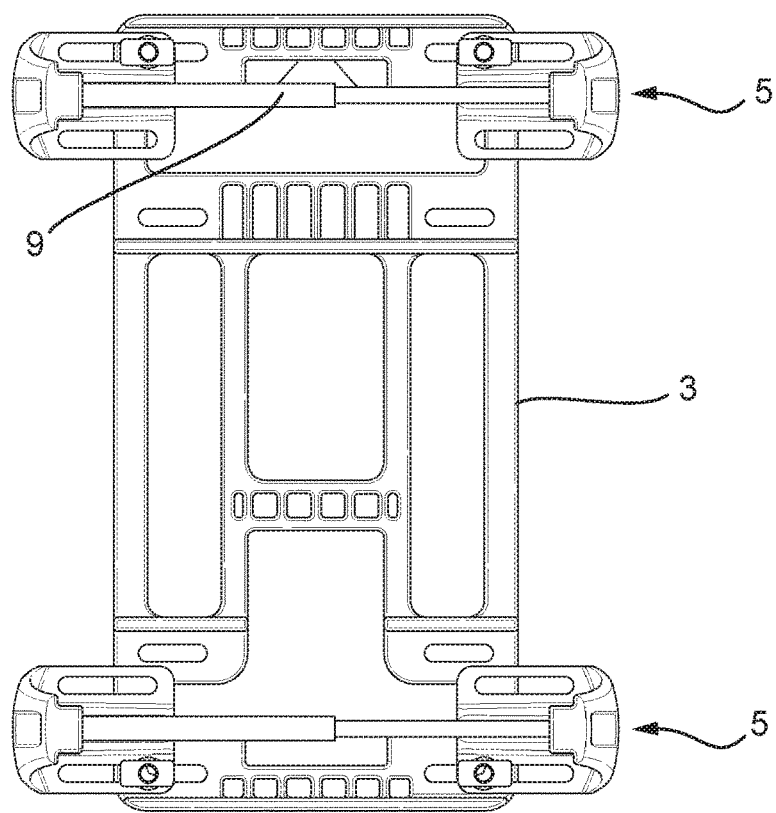
Figure 5B:
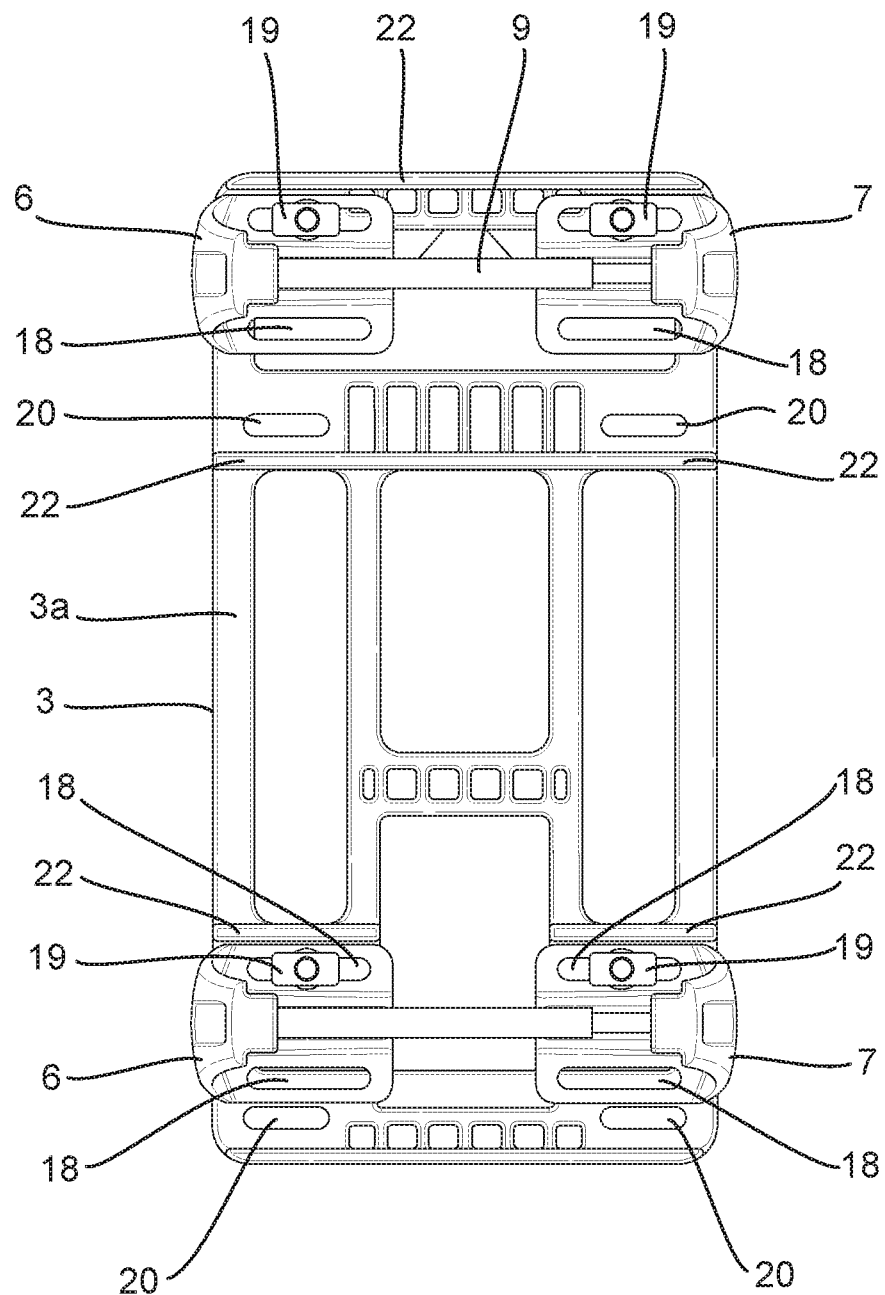
Figure 5C:
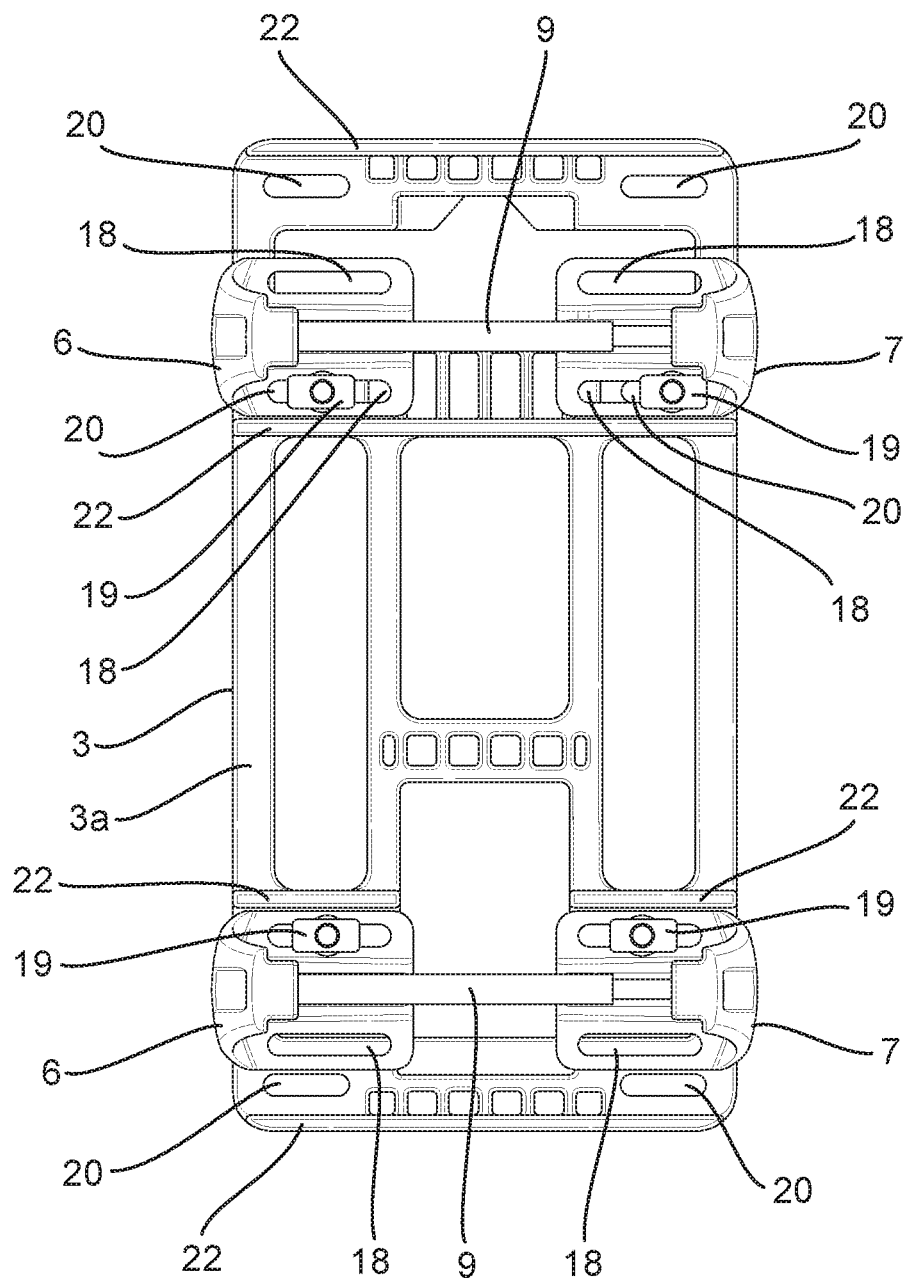
Figure 5D:
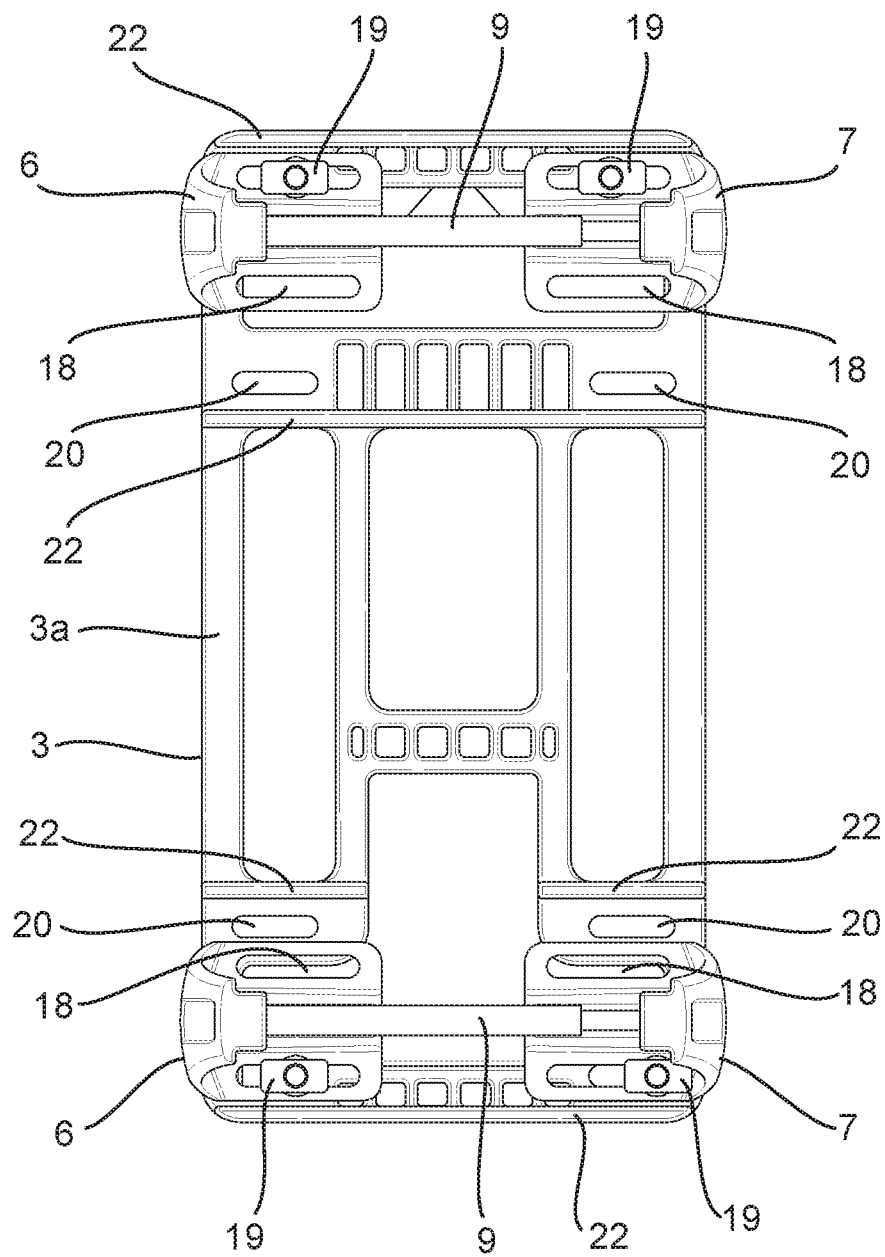

FIGS. 2*a*-2*d* show a front, side, top and bottom view respectively of the mounting system 1 of FIGS. 1*a*-1*e* in a first position adapted for a small size of luggage carrier 2, whereas FIG. 3 shows a front view of the mounting system of FIGS. 1*a*-1*e* in a second position adapted for a medium-sized luggage carrier and FIG. 4*a*-4*d* show a front, side, top and bottom view respectively of the mounting system of FIGS. 1*a*-1*e* in a third position adapted for a large luggage carrier. The side views in FIGS. 2*b* and 4*b* show the carrier coupling part 3 and the at least two coupling sets 5 of the clamping system. As explained above and illustrated in FIGS. 2*a*, 3 and 4*a*, the clamping set 5 includes a first clamping hook 6 and a second clamping hook 7, as well as an adjustment member 9 extending between said first clamping hook 6 and said second clamping hook 7. A shoulder 16 of each of said first clamping hook 6 and of said second clamping hook 7 includes an upper coupling part contact surface 16*a* and a lower rod contact surface 16*b*. The shoulder 16 of said first and second clamping hook 6, 7 is arranged to receive said adjustment member 9 between said upper coupling part contact surface 16*a* and said lower rod contact surface 16*b*. The adjustment member 9 comprises an externally threaded bolt 9*a* and an internally threaded tube 9*b* arranged to receive said externally threaded bolt 9*a*. A length of the internally threaded tube 9*b* is substantially the same as a length of a shank of the externally threaded bolt 9*a*, for example a length in the range of 85-90 mm, for example of approximately 88 mm. This length of the adjustment member 9 can allow adjustment of the distance between said first and second clamping hook 6, 7 to vary in a range of approximately 80-150 mm. This range is a continuous range, of which three examples have been shown in FIGS. 2*a*, 3, and 4*a*. Even in a most extended position of the clamping set 5, as shown in FIG. 4*a*, stability of the clamping set is provided by the internally threaded tube 9*b* still receiving part of the externally threaded bolt 9*a*. When the mounting system 1 is in a position suited for a relatively small bicycle luggage carrier 2, the clamping sets 5 can be adjusted such that it is smaller than a width of the carrier coupling part 3, which can be comprised in a range of approximately 115-135 mm. As a result, the clamping sets 5 can be positioned substantially under the carrier coupling part 3 and do not extend from under the carrier coupling part 3, as shown in FIGS. 2*a*, 2*c* and 2*d*. On the other hand, for larger bicycle luggage carriers, the clamping sets 5 can be extended beyond the width of the carrier coupling part 3, as illustrated in FIGS. 3, 4*a*, 4*c* and 4*d*. The front or rear views of the mounting system 1 in FIGS. 2*a*, 3 and 4*a* show that the first and second clamping hooks 6, 7 can each comprise an arm 6*a*, 7*a* forming an acute angle α with the shoulder 16. Said angle α is arranged to receive a longitudinal rod 8 of the bicycle luggage carrier 2. The longitudinal rod 8 can be engaged by the lower rod contact surface 16*b* and by an inner side of the arm 6*a*, 7*a*. The angle α between the shoulder 16 and the arm 6*a*, 7*a* of the first and second clamping hooks 6, 7 is comprised in a range of 45-60 degrees, preferably in a range of 50-60 degrees, and is around approximately 55 degrees in the embodiment as shown. The acute angle α between the shoulder 16 and the arm 6*a* of the first clamping hook 6 is turned towards the acute angle α between the shoulder 16 and the arm 7*a* of the second clamping hook 7. The angle α of the clamping hooks 6, 7 are thus turned towards each other such that the clamping hooks 6, 7 engage the longitudinal rods 8 from an outside of the bicycle luggage carrier 2, and the clamping force is directed inwardly, as seen in a front or rear view. An end of the arms 6*a*, 7*a* can also include a substantially right-angled edge 17, which can allow a wider opening between the first and second clamping hooks 6, 7, and which edge allows use of the mounting system 1 on an e-bike preventing a battery pack on a bicycle luggage carrier 2 from being engaged by the clamping hooks 6, 7.

FIGS. 5*a*-5*d* show a bottom view of the mounting system 1 of FIGS. 1*a*-1*e* in various mounting positions. The shoulder 16 of the clamping hooks 6, 7 is a slightly enlarged part with respect to the arm 6a, 7a of the clamping hook 6, 7, as can be seen in the side views of FIGS. 2b and 4b, and includes a substantially rectangular upper contact part coupling surface 16a. The shoulder 16 can include a single through-slit 18 substantially in parallel with the adjustment member 9 and arranged to receive fastening elements 4 for fastening the carrier coupling part 3 to the clamping system. Such a single through-slit 18 can be located centrally on the upper contact part coupling surface 16a, or off-centred. In the embodiment as illustrated, the shoulder 16 includes two through-slits 18 substantially in parallel, which are preferably located on either side of the shoulder 16 of the clamping hooks 6, 7 seen in a direction of the adjustment member 9. The carrier coupling part 3 also includes at least two pairs of through-slits 20, for example four pairs of through-slits 20 as shown in FIGS. 5a-5d. Each pair of slits 20 is arranged to receive fastening elements 4 for fastening the carrier coupling part 3 to one of the at least two clamping sets 5. Thereto, each of the through-slits 20 of one pair of through-slits is located on either side of the carrier coupling part 3 seen in a longitudinal direction of the carrier coupling part 3, and is transverse to said longitudinal direction. In this way, one of the two through-slits 18 in each the clamping hooks 6, 7 of a first clamping set 5 can cooperate with one pair of through-slits 20 in the carrier coupling part 5 to receive fastening elements 4 extending through both the through-slits 18 and the slits 20 to fasten the carrier coupling part 3 to the clamping system. The carrier coupling part 3 could also be configured to be fastened to a clamping set using more than only one through-slit in each of the clamping hooks 6, 7. In this embodiment, two of the pairs of through-slits 20 are located towards one of a front and a rear of the carrier coupling part 3 of the mounting system 1, whereas the other two pairs of the through-slits 20 in the carrier coupling part 3 are located on the opposite side of the carrier coupling part 3. The combination of two through-slits 18 in the shoulder 16 of the clamping hooks 6, 7 with for example three or four pairs of through-slits 20 in the carrier coupling part 3 can give rise to a large variety of mounting possibilities of the carrier coupling part 3 on the clamping system, and hence on the way of mounting the mounting system 1 on a bicycle luggage carrier 2. In order to limit said number of possibilities, a lower clamping set engaging side, or bottom side, 3a of the carrier coupling part 3 can include one or more transverse ridges 22 arranged to define a position of one of the at least two clamping sets 5 with respect to the carrier coupling part 3. At the same time, said one or more ridges 22 can guide a sliding movement of the clamping hooks 6, 7 during adjustment of the clamping system. The fastening elements 4 can for example comprise a bolt or screw and a nut 19, or any other fastening element known to the person skilled in the art. The nut 19 can be a generally known hexagonally shaped nut, or can for example include a substantially rectangularly shaped nut 19, which size can be chosen such that rotation of the screw or bolt can be blocked once mounted, preventing unwanted loosening of the fastening elements 4 and thus improving the security of the fastening of the carrier coupling part 3 on the mounting system 1.

Figure 6A:
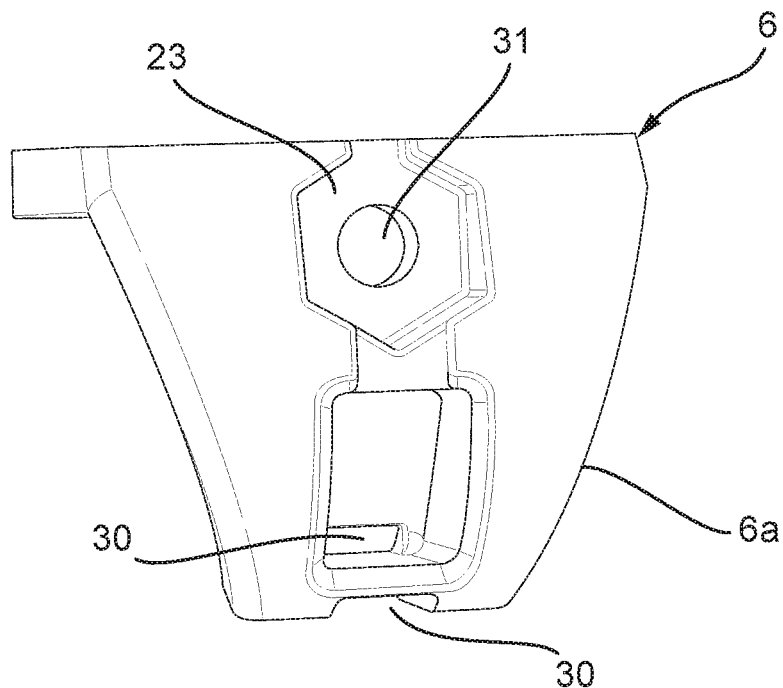
FIGS. 6a-6b show a perspective side view of a first clamping hook and a second clamping hook respectively.
Figure 6B:
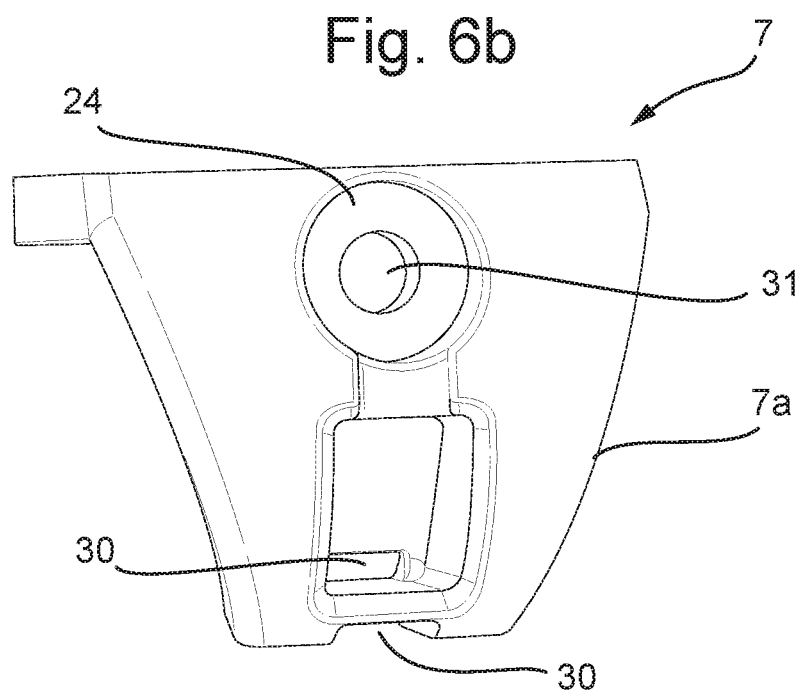

FIGS. 6a-6b show a perspective side view of a first clamping hook 6 and a second clamping hook 7 respectively. One of the first and second clamping hook 6, 7, for example the first clamping hook 6, can be arranged to block the internally threaded tube 9b (not shown) against rotation. Said first clamping hook 6 can for example comprise a non-circular, such as a hexagonally-shaped recess 23 arranged to receive a head of the adjustment member 9, in particular a head of the internally threaded tube 9b. The shape of the recess 23, surrounding an adjustment member receiving opening 31, can preferably substantially correspond to the shape of the adjustment member's head, but other shapes are possible. The other of the first and second clamping hook 6, 7, for example the second clamping hook 7, can comprise a substantially circular recess 24, arranged to receive a head of the externally threaded bolt 9a and configured to allow screwing of the bolt 9a to the desired clamping position. It will be clear to the person skilled in the art that other shapes of the adjustment member's head and of the recess in the clamping hooks, and even different rotation blocking mechanisms, are possible to obtain the same effect of allowing adjustment of the adjustment member 9 from a single side only. The first and second clamping hooks 6, 7 shown in FIGS. 6a and 6b also include two cable tie guiding slots 30, offering the option of tightening said clamping hooks to a longitudinal rod 8 using cable ties (see FIGS. 8a-8c), in addition to, or instead of, clamping the mounting system 1 by adjusting the adjustment member 9.

Figure 7A:
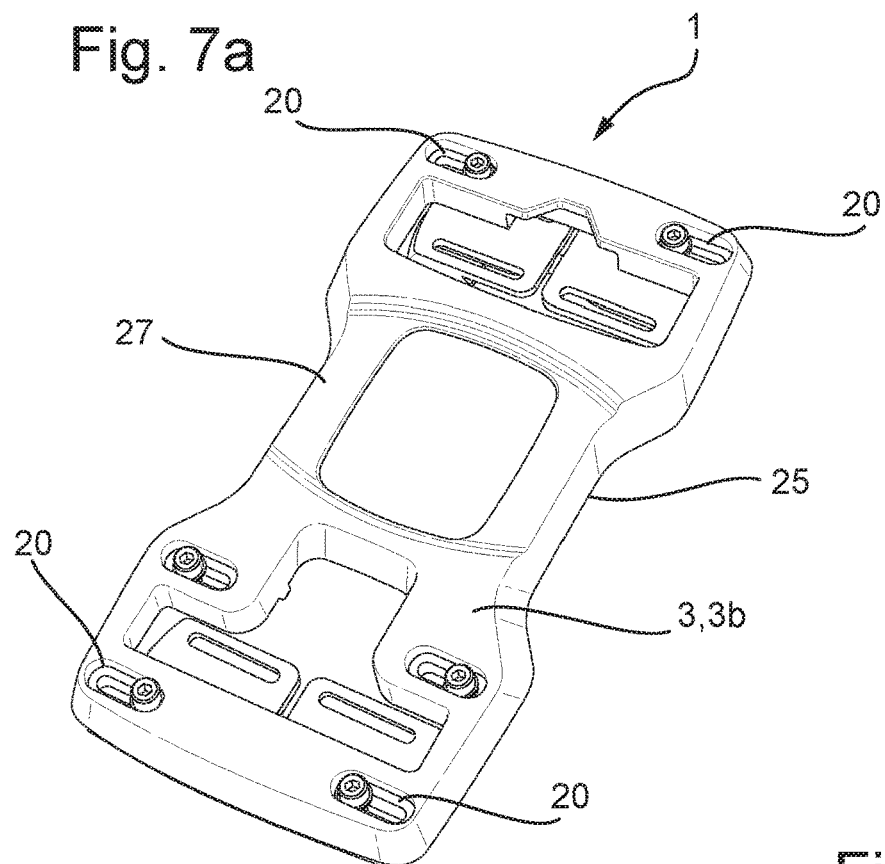
Figure 7B:
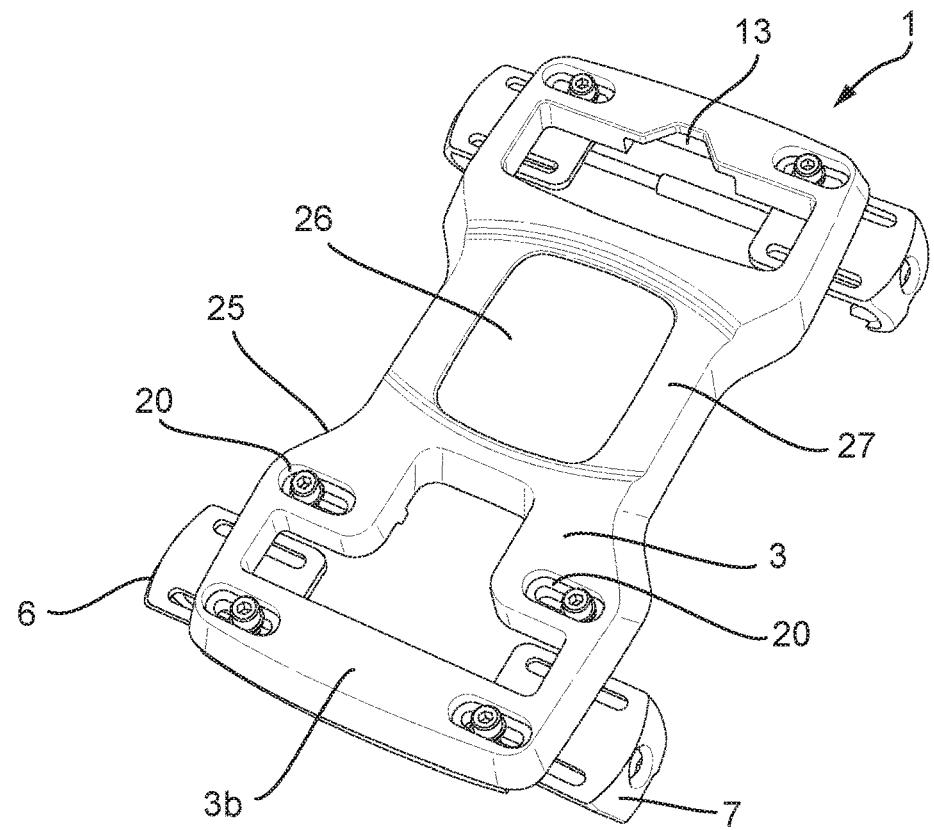
Figure 7C:
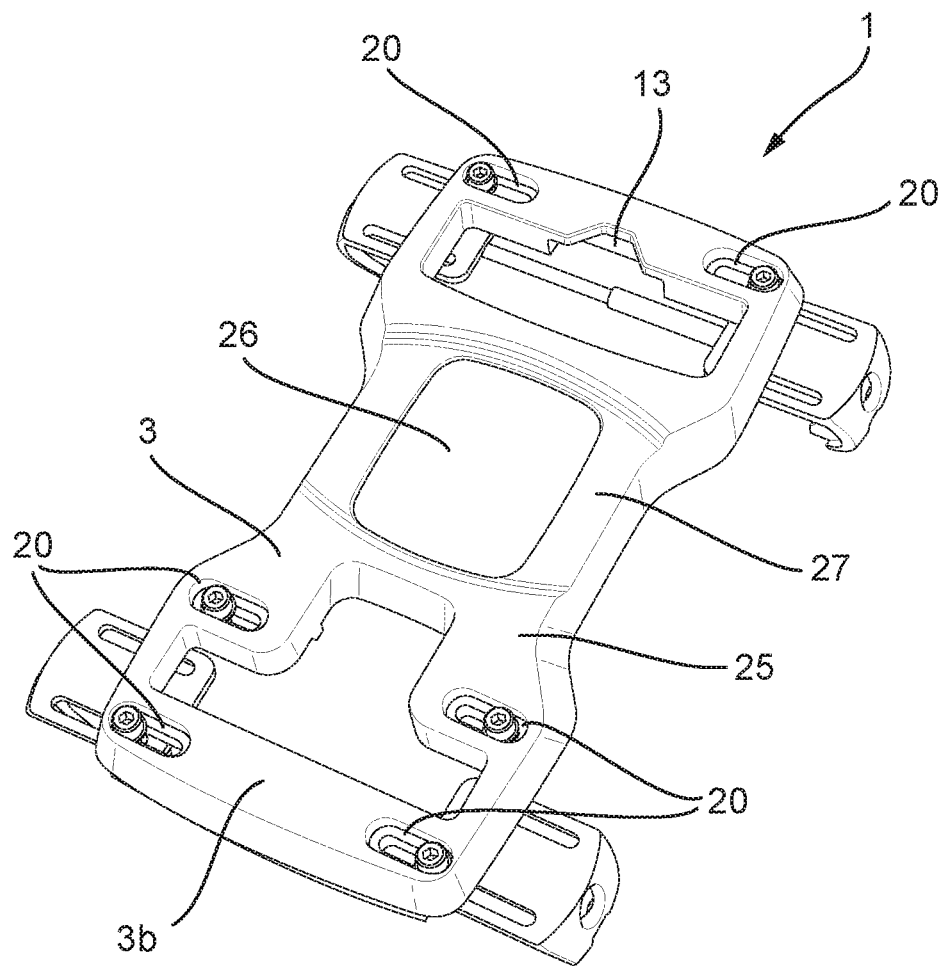

FIGS. 7a-7d show a perspective top (a-c) and bottom (d) view of a second exemplary embodiment of the mounting system 1 according to the invention. Most of the above-mentioned aspects also apply to this second embodiment, such as for example the various extension positions of the clamping system with respect to the carrier coupling part 3 from a position suitable for relatively small luggage carriers (FIG. 7a), in which the at least two clamping sets 5 do not extend beyond a width of the carrier coupling part 3, to positions for larger luggage carriers such as shown in FIGS. 7b and 7c. Especially the clamping sets 5 are substantially the same as in the previous embodiment. The first and second clamping hooks 6, 7 can advantageously be made of injection-moulded plastic, for example of a 2K material including PA and a plastic, or of another material or combination of materials ensuring a good grip of the clamping hooks 6, 7 on the longitudinal rods 8 of the bicycle luggage carrier 2. The carrier coupling part 3 of the second embodiment, however, includes some differences: the shape of the carrier coupling part 3, even if still being roughly rectangular, having a length in a range of approximately 230-240 mm, and a width in a range of approximately 118-130 mm, slightly differs in that a width of the carrier coupling part 3 includes a central narrowing 25, which can save material and weight. A further difference with respect to the previous embodiment is the number of pairs of through-slits 20 in the carrier coupling part 3, with only three pairs of through-slits 20 in this second embodiment. Optionally, unused pairs of slits could be covered with a corresponding covering element to prevent dirt from entering said slits (not shown). Also other openings in the carrier coupling part 3 can optionally be covered with a covering element 26. In both the first as well as the second embodiment of the mounting system 1, an upper side 3b of the carrier coupling part 3 includes a recess 27 over an entire width of the carrier coupling part 3 (see also FIGS. 2b and 4b). The width of the recess 27 along a longitudinal direction of the carrier coupling part 3 can vary from a small slot-like recess to a larger recess 27 as shown here. In both embodiments, the carrier coupling part 3 can also include a connecting opening 13 having a substantially isosceles trapezial shape arranged to receive a corresponding guiding element 12a of a corresponding luggage coupling part 10 of a bicycle accessory 11, as shown in FIGS. 1d and 1e. In FIGS. 5a-5d, it can be seen that the connecting opening 13 may be embedded in a recess 13b, which may be configured to engage a plate element 12c of a first coupling element 12 of the corresponding luggage coupling part 10. The recess 13b may be part of the connecting element 13a described in FIGS. 1a-1e. The connecting opening 13 can be located on a transverse rib at a first transverse side of the carrier coupling part 3, while a locking member 28, such as for example a recess or a ridge 28 can be positioned at an opposite transverse side of the carrier coupling part 3. Said locking member 28 can for example be configured to receive a coupling element, such as a pre-tensioned hook element 14 of a luggage coupling part 10, as shown in FIG. 1d. Other connecting elements, configured to cooperate with corresponding connecting elements of a luggage carrier part 10, can also be incorporated into the carrier coupling part 3. The carrier coupling part 3 can preferably be made of an injection-moulded material, such as for example a plastic material, for example PP, PA, PVC, or any other suitable plastic material. It is also preferred that the carrier coupling plate 3 has a substantially flat upper side 3b arranged to face a substantially flat bottom side of a luggage coupling part 10.

Figure 8A:
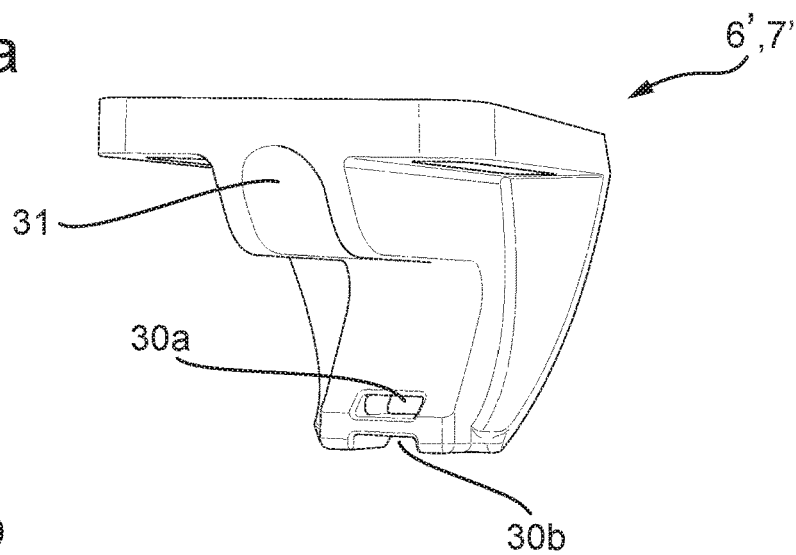
FIGS. 8a-8c show a perspective view of a first or second clamping hook of a mounting system according to a second aspect of the invention.
Figure 8B:
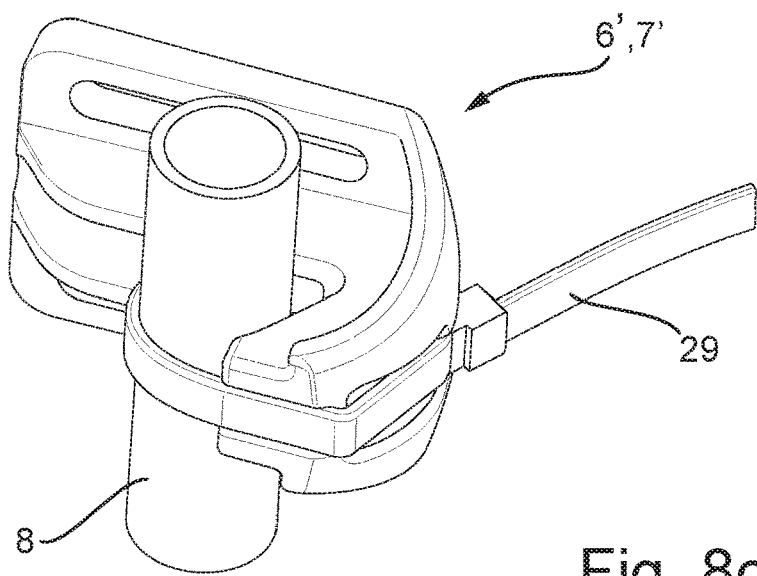
Figure 8C:
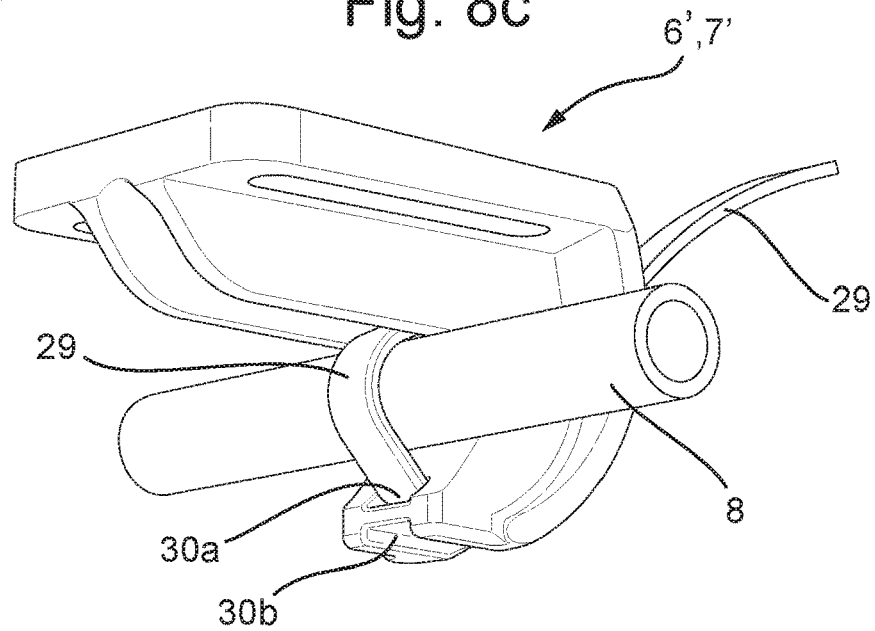

FIGS. 8a-8c show a perspective view of a first or second clamping hook 6', 7' of a mounting system 1' according to a second aspect of the invention. The mounting system 1' differs from the previous embodiments in that an adjustment member 9 extending between the first and second clamping hooks 6', 7' is absent, so that these clamping hooks 6', 7' are not connected to each other. The clamping hooks 6', 7' are arranged to clamp a longitudinal rod 8 of the bicycle luggage carrier 2 using a cable tie 29. Thereto, an arm of each of the first and second clamping hooks 6', 7' includes at least one, preferably two, cable tie guiding slots 30. Two or even more cable tie guiding slots 30 in the arm 6a, 7a of the clamping hooks 6', 7' can provide an optimal clamping around the longitudinal rod 8, independently of the rod's diameter. A first cable tie guiding slot 30a can for example be used for rod diameters in a range between 6-12 mm, and a second cable tie guiding slot 30b, located more towards an end of the arm 6a, 7a than the first cable tie guiding slot 30a, can for example be used for larger rod diameters in a range of approximately 12-16 mm. In an advantageous embodiment of the mounting systems 1, 1' according to the invention, the first and second clamping hooks 6, 7 are configured such that they can be used in each of the mounting systems 1 and 1' by providing the clamping hooks both with an adjustment member receiving opening 31 as well as with said one or more cable tie guiding slots 30, as is also shown in FIGS. 6a and 6b. In this way, in case of use with cable ties 29, the cable tie 29 can pass through the adjustment member receiving opening 31, around a longitudinal rod 8 of a bicycle luggage carrier 2, and back through one of the cable tie guiding slots 30 to be tightened.

Figure 9A:
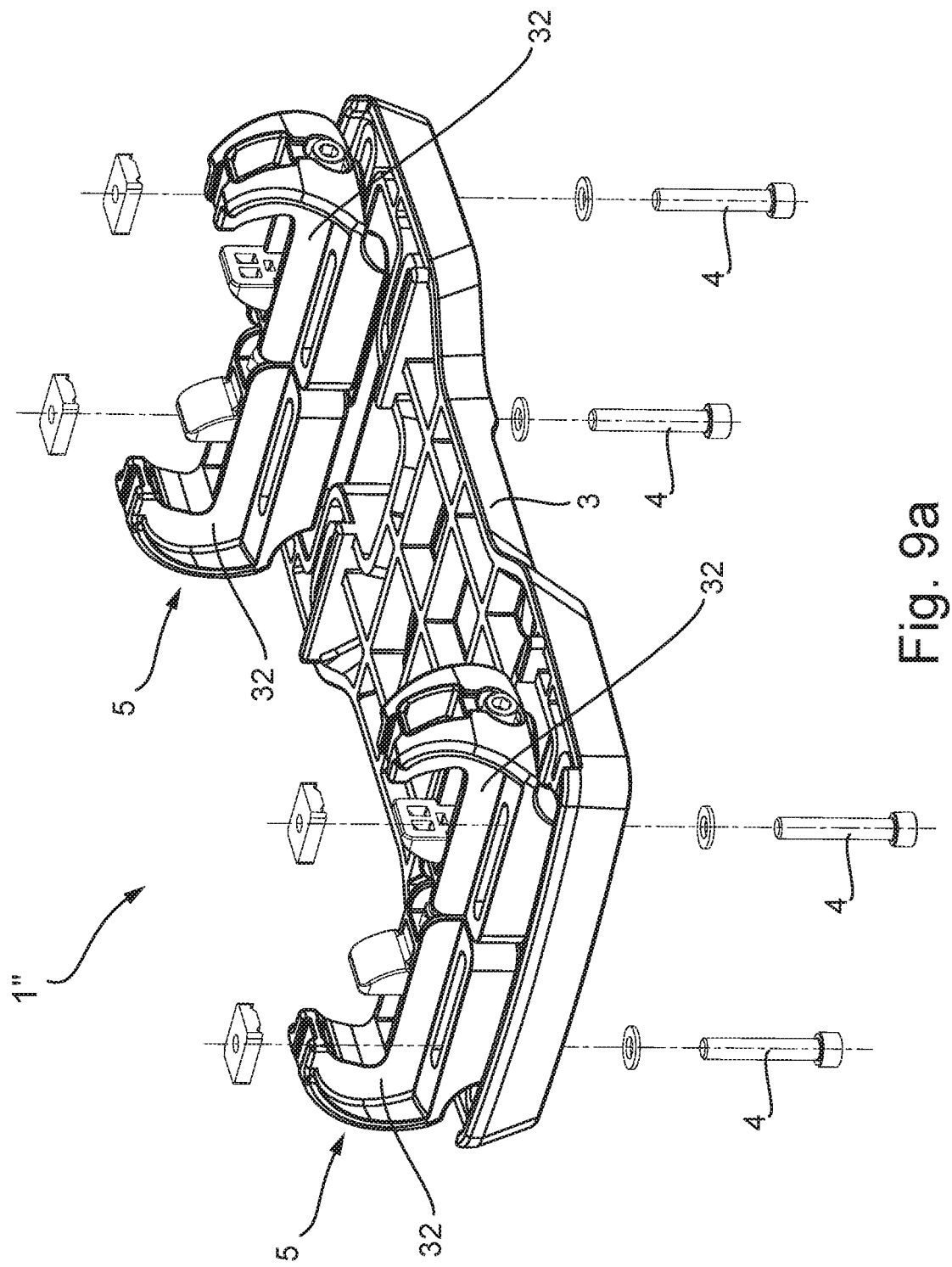
FIGS. 9a-9c show a perspective, bottom view of a mounting system and a clamp according to a third aspect of the invention.
Figure 9B:
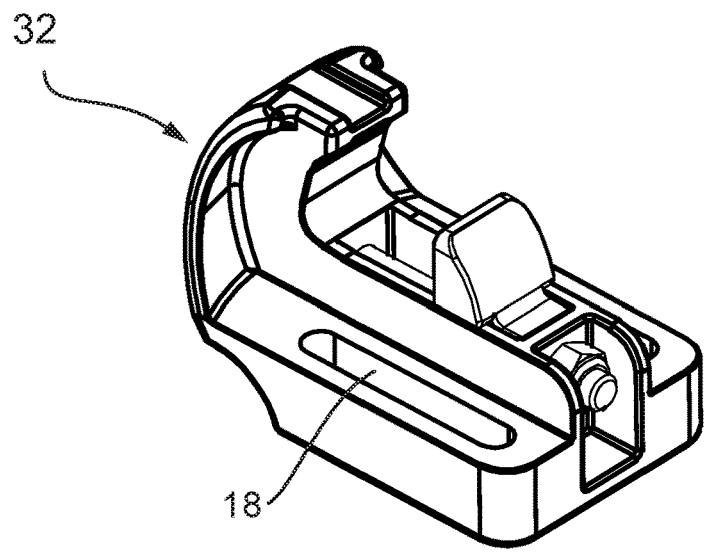
Figure 9C:
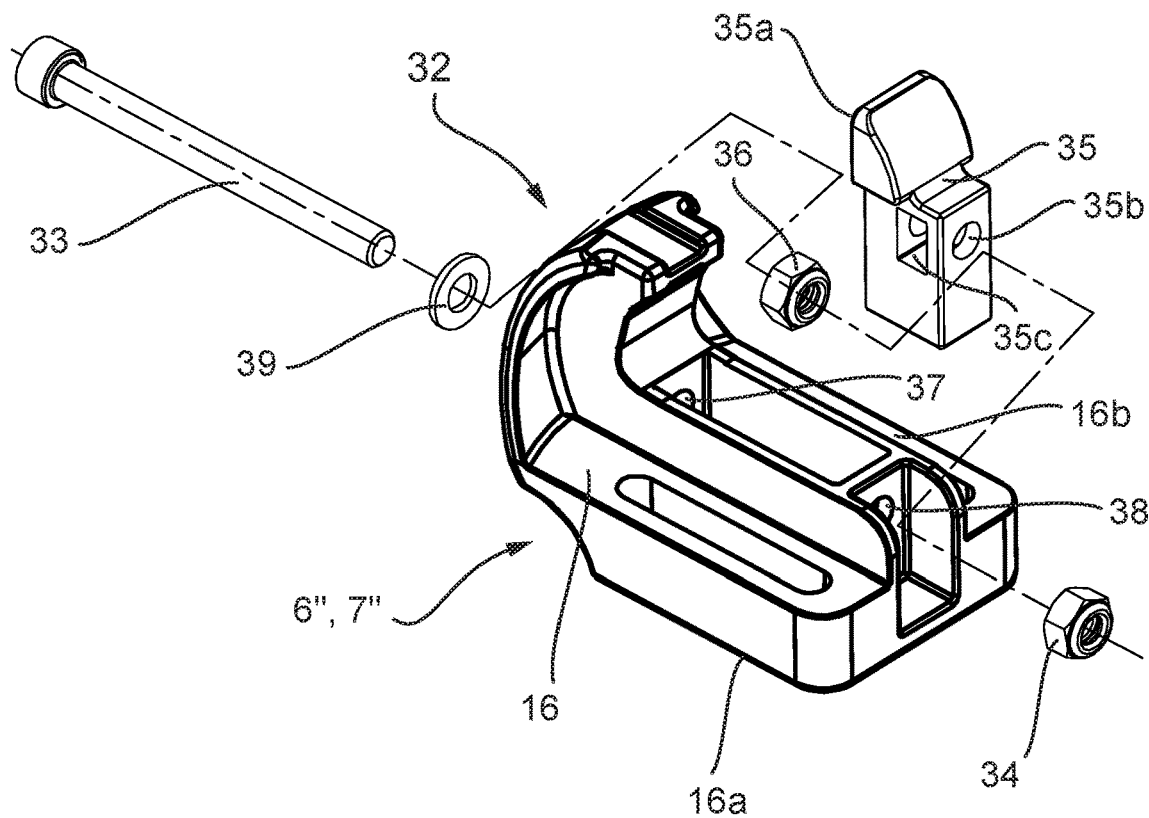

FIGS. 9a-9c show a perspective, bottom view of a mounting system 1" and a clamp 32 according to a third aspect of the invention. The mounting system 1" according to the third aspect of the invention is mountable on a bicycle luggage carrier 2 and comprises a clamping system for clamping on the bicycle luggage carrier 2 and a carrier coupling part 3 mountable on the clamping system.

The carrier coupling part 3 is configured to cooperate with a corresponding luggage coupling part 10 of a bicycle accessory 11 and can be the same as the carrier coupling part 3 according to the previous embodiments of the invention. The mounting of the carrier coupling part 3 with the luggage coupling part 10 of a bicycle accessory 11 will then work in the same way as described in the previous embodiments.

The clamping system comprises at least two clamping sets 5. The mounting system 1" differs from the first aspect of the invention in that an adjustment member 9 extending between a first and a second clamping hook 6", 7" is absent, so that these clamping hooks 6", 7" are not directly connected to each other. The mounting system 1" differs from the second aspect of the invention in that the clamping hooks 6", 7" are not arranged to clamp a longitudinal rod 8 of the bicycle luggage carrier 2 by using a cable tie 29. Instead each clamping set 5 includes two clamps 32 which can be essentially the same. Each clamp 32 comprises a clamping hook 6", 7" having a shoulder 16 and an arm 6a", 7a" forming a receiving space to receive a longitudinal rod 8 of the bicycle luggage carrier 2. The clamping hook 6", 7" can be the same as the clamping hooks 6, 6', 7, 7' of the previous embodiments, except when it is explicitly mentioned otherwise in the description of this embodiment. The clamping hooks 6", 7" of the clamps 32 can be mounted to the carrier coupling part 3 in the same way as the clamping hooks 6, 7, 6', 7' are mounted to the carrier coupling part 3, which ways are described in the previous embodiments.

Each clamp 32 further comprises a clamping block 35 and a clamping bolt 33 which is rotatably arranged in the clamping hook 6", 7" and which slidably connects the clamping block 35 with the clamping hook 6", 7". In this way each clamp 32 can be individually clamped to the longitudinal rod 8 of the bicycle luggage carrier 2 by means of said clamping block 35 and said clamping bolt 33.

A shoulder 16 of the clamping hook 6", 7' includes an upper coupling part contact surface 16a and a lower rod contact surface 16b. The clamping bolt 33 extends between said upper coupling part contact surface 16a and said lower rod contact surface 16b.

Each clamping block 35 can be provided with a bore 35b. The bore 35b can be of such a size that the clamping block 35 can only translate in a longitudinal direction of the clamping bolt 33, and is prevented from movement in any other direction. For fixating the clamping block 35, the clamp 32 may include a nut 36, which engages the clamping bolt 33. This nut 36 can be accommodated in a nut chamber 35c of the clamping block. Instead of using the nut 36 for fixating the clamping block, the bore 35b can be provided with an internal screw thread which engages the clamping bolt 33.

For mounting the mounting system 1" to the bicycle luggage carrier 2, an inner side of the arm 6a" 7" and the lower rod contact surface 16b of the clamps 32 can be placed to engage the longitudinal rod 8 of the bicycle luggage carrier 2. In case that the clamp 32 is provided with a nut 36, rotating or screwing the clamping bolt 33, will translate this nut 36 along the clamping bolt 33. In doing so the nut 36 can push the clamping block 35 against the longitudinal rod 8 of the bicycle luggage carrier, pressing a clamping surface 35a of the clamping block 35 against the longitudinal rod 8 of the bicycle luggage carrier 2. In case the bore 35b of the clamping block 35 is provided with an internal screw thread, rotating or screwing the clamping bolt 33 will result in a translation of the clamping block 35 along the clamping bolt 33 and can result in pulling of the clamping block 35 against the longitudinal rod 8 of the bicycle luggage carrier 2 by the clamping bolt 33, thus also pressing the clamping surface 35a of the clamping block 35 against the longitudinal rod 8 of the bicycle luggage carrier 2.

The above described position of the clamping block 35, wherein the longitudinal rod 8 of the bicycle luggage carrier 2 is clamped by the clamp 32 between its inner side of the arm and the clamping surface 35a of the clamping block 35, is called a clamping position. The clamping block also has a release position wherein the clamping surface 35a of the clamping block 35 is free of the longitudinal rod 8 of the bicycle luggage carrier 2. In this latter position the mounting system 1" can be detached from the bicycle luggage carrier 2.

The clamping hook 6", 7" may have a cross rib spaced apart from the arm along a longitudinal axis of the clamping bolt 33 and having a bore 38 through which the clamping bolt 33 extends and is rotatably mounted. The arm 6a", 7a" also includes a bore 37 through which the clamping bolt 33 extends and is rotatably mounted. Between the arm 6a", 7a" and the cross rib a space is provided for accommodating the mounting block 35. In this way the mounting block 35 can not be removed from the clamping bolt 33 whilst the clamping bolt 33 remains in the bores 37, 38. This means the mounting block 35 can also not accidentally fall off during the mounting of the mounting system 1".

The clamp 32 can include a second nut 34, wherein a head of the clamping bolt 33 is positioned at a side of the arm 6a", 7a" which is directed away from the shoulder 16 and wherein the second nut 34 is positioned at a side of the cross rib that is directed away from the arm 6a", 7a". This second nut 34 has no clamping functionality. It is only provided to ensure the clamping bolt 33 does not disengage the clamp 32. To further protect the clamping hook 6", 7" a washer 39 can be placed between a head of the clamping bolt 33 and the clamping hook 6", 7".

For the purpose of clarity and a concise description, features are described herein as part of the same or separate embodiments, however, it will be appreciated that the scope of the invention may include embodiments having combinations of all or some of the features described. It may be understood that the embodiments shown have the same or similar components, apart from where they are described as being different.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage. Many variants will be apparent to the person skilled in the art. All variants are understood to be comprised within the scope of the invention defined in the following claims.

The invention claimed is:

1. A mounting system mountable on a bicycle luggage carrier, comprising a clamping system for clamping on the bicycle luggage carrier and a carrier coupling part mountable on the clamping system and configured to cooperate with a corresponding luggage coupling part of a bicycle accessory, wherein the clamping system comprises at least two clamping sets, each clamping set including two clamps, wherein each clamp comprises:
   a clamping hook having a shoulder and an arm forming a receiving space to receive a longitudinal rod of the bicycle luggage carrier;
   a clamping block; and
   a clamping bolt which is rotatably arranged in the clamping hook and which slidably connects the clamping block with the clamping hook,
   wherein the clamping hook has a cross rib spaced apart from the arm along a longitudinal axis of the clamping bolt and having a bore through which the clamping bolt extends and is rotatably mounted, and
   wherein the arm also includes a bore through which the clamping bolt extends and is rotatably mounted.

2. The mounting system according to claim 1, wherein the shoulder of the clamping hook includes an upper coupling part contact surface and a lower rod contact surface, wherein the clamping bolt extends between said upper coupling part contact surface and said lower rod contact surface.

3. The mounting system according to claim 1, wherein the clamp further comprises a nut which engages the clamping bolt and is accommodated in a nut chamber of the clamping block.

4. The mounting system according to claim 1, wherein the clamping block is provided with a bore having internal screw thread which engages the clamping bolt.

5. The mounting system according to the combination of claim 3, wherein the clamp includes a second nut, wherein a head of the clamping bolt is positioned at a side of the arm which is directed away from the shoulder and wherein the second nut is positioned at a side of the cross rib that is directed away from the arm.

6. A mounting system mountable on a bicycle luggage carrier, comprising a clamping system for clamping on the bicycle luggage carrier and a carrier coupling part mountable on the clamping system and configured to cooperate with a corresponding luggage coupling part of a bicycle accessory,
   wherein the clamping system comprises at least two clamping sets, each clamping set including a first clamping hook and a second clamping hook each arranged to clamp a longitudinal rod of the bicycle luggage carrier, the clamping set further including an adjustment member located below the carrier coupling part and extending between said first clamping hook and said second clamping hook such that a distance between said first and second clamping hook is adjustable, wherein the adjustment member comprises a first element and a second element, the first element movably coupled to the second element to adjust a length of the adjustment member,
   wherein a shoulder of each of said first clamping hook and of said second clamping hook includes an upper coupling part contact surface and a lower rod contact surface, wherein the shoulder of said first and second clamping hook is arranged to receive said adjustment member between said upper coupling part contact surface and said lower rod contact surface.

7. The mounting system according to claim 6, wherein said adjustment member comprises an externally threaded bolt and an internally threaded tube arranged to receive said externally threaded bolt.

8. The mounting system according to claim 7, wherein a length of the internally threaded tube is the same as a length of a shank of the externally threaded bolt.

9. The mounting system according to claim 7, wherein one of the first and second clamping hook is arranged to block the internally threaded tube against rotation.

10. The mounting system according to claim 6, wherein a length of the adjustment member allows adjustment of the distance between said first and second clamping hook to vary in a range of approximately 70-160 mm, preferably in a range of approximately 80-150 mm.

11. The mounting system according to claim 6, wherein the first and second clamping hooks each comprise an arm having an acute angle with the shoulder forming a receiving space to receive a longitudinal rod of the bicycle luggage carrier.

12. The mounting system according to claim 11, wherein the angle between the shoulder and the arm of the first and second clamping hooks is comprised in a range of approximately 45-60 degrees, preferably in a range of approximately 50-60 degrees, more preferably around approximately 55 degrees.

13. The mounting system according to claim 11, wherein the receiving spaces of the first and second clamping hooks of one of the at least two clamping sets are facing each other.

14. The mounting system according to claim 6, wherein the first and second clamping hooks are manufactured from a plastic material.

15. The mounting system according to claim 6, wherein the first and second clamping hooks are manufactured by means of injection-moulding.

16. The mounting system according to claim 1, wherein the carrier coupling part includes at least two pairs of through-slits, wherein each pair of slits is arranged to receive fastening elements for fastening the carrier coupling part to one of the at least two clamping sets.

17. The mounting system according to claim 1, wherein a lower clamping set engaging side of the carrier coupling part includes at least one transverse ridge arranged to define a position of one of the at least two clamping sets with respect to the carrier coupling part.

18. The mounting system according to claim 1, wherein an upper side of the carrier coupling part includes a recess over an entire width of the carrier coupling part.

19. The mounting system according to claim 1, wherein the carrier coupling part includes a V-shaped opening arranged to receive a corresponding guiding element of a coupling element of a corresponding luggage coupling part of a bicycle accessory.

20. The mounting system according to claim 1, wherein the carrier coupling part includes a locking member for receiving a locking element of a corresponding luggage coupling part of a bicycle accessory.

21. The mounting system according to claim 6, wherein the first element is telescopically coupled to the second element.

22. The mounting system according to claim 6, wherein the first element and the second element are arranged such that an entire length of the adjustment member is contained between the shoulders of the first clamping hook and the second clamping hook.

23. A mounting system mountable on a bicycle luggage carrier, comprising a clamping system for clamping on the bicycle luggage carrier and a carrier coupling part mountable on the clamping system and configured to cooperate with a corresponding luggage coupling part of a bicycle accessory,
   wherein the clamping system comprises at least two clamping sets, each clamping set including a first clamping hook and a second clamping hook each arranged to clamp a longitudinal rod of the bicycle luggage carrier using a cable tie,
   wherein a shoulder of each of said first clamping hook and of said second clamping hook includes at least one through-slit arranged to receive fastening elements for fastening the carrier coupling part to the clamping system,
   wherein the carrier coupling part includes at least two pairs of through-slits,
   wherein each pair of slits is arranged to receive said fastening elements, and
   wherein an arm of each of the first and second clamping hook includes at least one, cable tie guiding slots.

\* \* \* \* \*